United States Patent

Cocke et al.

[15] 3,701,111

[45] Oct. 24, 1972

[54] METHOD OF AND APPARATUS FOR DECODING VARIABLE-LENGTH CODES HAVING LENGTH-INDICATING PREFIXES

[72] Inventors: John Cocke, Mt. Kisco; Jacques H. Mommens, Briarcliff Manor; Josef Raviv, Ossining, all of N.Y.

[73] Assignee: International Business Machines Corporation, Armonk, N.Y.

[22] Filed: Feb. 8, 1971

[21] Appl. No.: 113,473

[52] U.S. Cl...............................................340/172.5
[51] Int. Cl...............................................G06f 7/00
[58] Field of Search......340/172.5, 347 DD; 235/154

[56] References Cited

UNITED STATES PATENTS

| | | | |
|---|---|---|---|
| 3,331,056 | 7/1967 | Lethin et al. | 340/172.5 |
| 3,237,170 | 2/1966 | Blasbalg et al. | 340/172.5 |
| 3,422,405 | 1/1969 | Packard et al. | 340/172.5 |
| 3,593,309 | 7/1971 | Clark et al. | 340/172.5 |
| 3,618,027 | 11/1971 | Tse-Yun Feng | 340/172.5 |

*Primary Examiner*—Paul J. Henon
*Assistant Examiner*—Melvin B. Chapnick
*Attorney*—Hanifin and Jancin and Charles P. Boberg

[57] ABSTRACT

This code conversion method enables data which has been coded in the form of variable-length bit strings for data compaction purposes to be processed by hardware units of conventional design that handle data in the form of fixed-length bit strings. The coding scheme is such that in the bit string of each variable-length code whose length exceeds a certain fixed number of bits N, the first N bits constitute a "length prefix" which uniquely designates the code length. This N-bit prefix is decoded by a first decoding table to give a base address in a second decoding table. The remaining bits of the variable-length code, whose number is known from the length prefix, then are decoded to give a displacement value relative to the base address for locating the address at which the decoded fixed-length word is found. Concurrently with the execution of this second decoding step, the first step in the decoding of the next variable-length code is performed. If a variable-length code does not have more than N bits, it is decoded in one step by the first decoding table, which stores the decoded word at every address therein which may be designated by all possible N-bit combinations containing the aforesaid variable-length code as their leading portion. A length indication read out of the first table then shifts the address register contents by an appropriate amount to bring the next succeeding variable-length code into the leading position therein.

20 Claims, 28 Drawing Figures

BLOCK DIAGRAM
OF INDEPENDENT DECODER

EXAMPLE OF
CONVENTIONAL HUFFMAN CODING

INVENTORS
JOHN COCKE
JACQUES H. MOMMENS
JOSEF RAVIV

BY Charles P. Boberg
ATTORNEY

FIG. 2

EXAMPLE OF CONSTRAINED HUFFMAN CODING

| NUMBER | VL CODE (3 TO 8 BITS) | CODE LENGTH | PREFIX (4 BITS) | ID CODE (5 BITS) |
|---|---|---|---|---|
| 0 | 1 0 0 | 3 | 1 0 0 0 OR 1 0 0 1 | 0 0 0 0 0 |
| 1 | 1 0 1 | 3 | 1 0 1 0 OR 1 0 1 1 | 0 0 0 0 1 |
| 2 | 1 1 0 | 3 | 1 1 0 0 OR 1 1 0 1 | 0 0 0 1 0 |
| 3 | 1 1 1 | 3 | 1 1 1 0 OR 1 1 1 1 | 0 0 0 1 1 |
| 4 | 0 1 1 1 | 4 | 0 1 1 1 | 0 0 1 0 0 |
| 5 | 0 1 1 0 | 4 | 0 1 1 0 | 0 0 1 0 1 |
| 6 | 0 1 0 1 | 4 | 0 1 0 1 | 0 0 1 1 0 |
| 7 | 0 1 0 0 0 | 5 | 0 1 0 0 | 0 0 1 1 1 |
| 8 | 0 1 0 0 1 | 5 | 0 1 0 0 | 0 1 0 0 0 |
| 9 | 0 0 1 1 0 0 | 6 | | 0 1 0 0 1 |
| 10 | 0 0 1 1 0 1 | 6 | | 0 1 0 1 0 |
| 11 | 0 0 1 1 1 0 | 6 | 0 0 1 1 | 0 1 0 1 1 |
| 12 | 0 0 1 1 1 1 | 6 | | 0 1 1 0 0 |
| 13 | 0 0 0 1 0 0 | 6 | | 0 1 1 0 1 |
| 14 | 0 0 0 1 0 1 | 6 | | 0 1 1 1 0 |
| 15 | 0 0 0 1 1 0 | 6 | 0 0 0 1 | 0 1 1 1 1 |
| 16 | 0 0 0 1 1 1 | 6 | | 1 0 0 0 0 |
| 17 | 0 0 1 0 0 0 | 6 | | 1 0 0 0 1 |
| 18 | 0 0 1 0 0 1 | 6 | | 1 0 0 1 0 |
| 19 | 0 0 1 0 1 0 | 6 | 0 0 1 0 | 1 0 0 1 1 |
| 20 | 0 0 1 0 1 1 | 6 | | 1 0 1 0 0 |
| 21 | 0 0 0 0 0 0 0 0 | 8 | | 1 0 1 0 1 |
| 22 | 0 0 0 0 0 0 0 1 | 8 | | 1 0 1 1 0 |
| 23 | 0 0 0 0 0 0 1 0 | 8 | | 1 0 1 1 1 |
| 24 | 0 0 0 0 0 0 1 1 | 8 | | 1 1 0 0 0 |
| 25 | 0 0 0 0 0 1 0 0 | 8 | | 1 1 0 0 1 |
| 26 | 0 0 0 0 0 1 0 1 | 8 | 0 0 0 0 | 1 1 0 1 0 |
| 27 | 0 0 0 0 0 1 1 0 | 8 | | 1 1 0 1 1 |
| 28 | 0 0 0 0 0 1 1 1 | 8 | | 1 1 1 0 0 |
| 29 | 0 0 0 0 1 0 0 0 | 8 | | 1 1 1 0 1 |
| 30 | 0 0 0 0 1 0 0 1 | 8 | | 1 1 1 1 0 |
| 31 | 0 0 0 0 1 0 1 0 | 8 | | 1 1 1 1 1 |

P

| NO. | C | L | | AB | | | | |
|---|---|---|---|---|---|---|---|---|
| 0 | 1 | 1 | 1 | 0 | 0 | 0 | 0 | 0 |
| 1 | 1 | 0 | 1 | 0 | 0 | 0 | 1 | 1 |
| 2 | 1 | 0 | 1 | 0 | 0 | 1 | 0 | 0 |
| 3 | 1 | 0 | 1 | 0 | 0 | 1 | 0 | 1 |
| 4 | 1 | 0 | 0 | 0 | 1 | 1 | 0 | 0 |
| 5 | 0 | 1 | 1 | 0 | 0 | 1 | 1 | 0 |
| 6 | 0 | 1 | 1 | 0 | 0 | 1 | 0 | 1 |
| 7 | 0 | 1 | 1 | 0 | 0 | 1 | 0 | 0 |
| 8 | 0 | 1 | 0 | 0 | 0 | 0 | 0 | 0 |
| 9 | 0 | 1 | 0 | 0 | 0 | 0 | 0 | 0 |
| 10 | 0 | 1 | 0 | 0 | 0 | 0 | 0 | 1 |
| 11 | 0 | 1 | 0 | 0 | 0 | 0 | 0 | 1 |
| 12 | 0 | 1 | 0 | 0 | 0 | 0 | 1 | 0 |
| 13 | 0 | 1 | 0 | 0 | 0 | 0 | 1 | 0 |
| 14 | 0 | 1 | 0 | 0 | 0 | 0 | 1 | 1 |
| 15 | 0 | 1 | 0 | 0 | 0 | 0 | 1 | 1 |

S

| NO. | S | | | | |
|---|---|---|---|---|---|
| 0 | 1 | 0 | 1 | 0 | 1 |
| 1 | 1 | 0 | 1 | 1 | 0 |
| 2 | 1 | 0 | 1 | 1 | 1 |
| 3 | 1 | 1 | 0 | 0 | 0 |
| 4 | 1 | 1 | 0 | 0 | 1 |
| 5 | 1 | 1 | 0 | 1 | 0 |
| 6 | 1 | 1 | 0 | 1 | 1 |
| 7 | 1 | 1 | 1 | 0 | 0 |
| 8 | 1 | 1 | 1 | 0 | 1 |
| 9 | 1 | 1 | 1 | 1 | 0 |
| 10 | 1 | 1 | 1 | 1 | 1 |
| 11 | X | X | X | X | X |
| 12 | 0 | 1 | 1 | 0 | 1 |
| 13 | 0 | 1 | 1 | 1 | 0 |
| 14 | 0 | 1 | 1 | 1 | 1 |
| 15 | 1 | 0 | 0 | 0 | 0 |
| 16 | 1 | 0 | 0 | 0 | 1 |
| 17 | 1 | 0 | 0 | 1 | 0 |
| 18 | 1 | 0 | 0 | 1 | 1 |
| 19 | 1 | 0 | 1 | 0 | 0 |
| 20 | 0 | 1 | 0 | 0 | 1 |
| 21 | 0 | 1 | 0 | 1 | 0 |
| 22 | 0 | 1 | 0 | 1 | 1 |
| 23 | 0 | 1 | 1 | 0 | 0 |
| 24 | 0 | 0 | 1 | 1 | 1 |
| 25 | 0 | 1 | 0 | 0 | 0 |
| 26 | X | X | X | X | X |
| 27 | X | X | X | X | X |
| 28 | X | X | X | X | X |
| 29 | X | X | X | X | X |
| 30 | X | X | X | X | X |
| 31 | X | X | X | X | X |

XXXXX = NOT USED

INDEPENDENT DECODING

| CHARACTER | GROUP 0 | GROUP 1 | GROUP 2 |
|---|---|---|---|
| A | 5 | 7 | 29 |
| B | 4 | 5 | 10 |
| C | 2 | 30 | 3 |
| D | 12 | 8 | 4 |
| E | 3 | 9 | 9 |
| F | 18 | 29 | 11 |
| G | 24 | 10 | 0 |
| H | 19 | 11 | 12 |
| I | 14 | 31 | 2 |
| J | 6 | 0 | 28 |
| K | 27 | 13 | 27 |
| L | 30 | 12 | 5 |
| M | 11 | 28 | 26 |
| N | 20 | 20 | 25 |
| O | 25 | 14 | 30 |
| P | 7 | 27 | 24 |
| Q | 21 | 1 | 31 |
| R | 31 | 15 | 6 |
| S | 9 | 2 | 23 |
| T | 29 | 26 | 22 |
| U | 10 | 6 | 1 |
| V | 13 | 21 | 13 |
| W | 8 | 19 | 14 |
| X | 15 | 16 | 15 |
| Y | 0 | 23 | 16 |
| Z | 22 | 25 | 8 |
| BLANK | 1 | 17 | 21 |
| ? | 16 | 3 | 20 |
| . | 26 | 18 | 7 |
| $ | 23 | 4 | 19 |
| + | 17 | 24 | 18 |
| * | 28 | 22 | 17 |

REFER TO NUMBERS IN LEFTMOST COLUMN OF FIG. 2

FIG. 5
DEPENDENT CODING

FIG. 6
NAME TO BE ENCODED:
C. BRICE
| CHARACTER | PRECEDING CHARACTER | GROUP | NUMBER | VL CODE (FIG. 2) |
|---|---|---|---|---|
| C | NONE | 0 | 2 | 1 1 0 |
| . | C | 2 | 7 | 0 1 0 0 0 |
| BLANK | . | 1 | 17 | 0 0 1 0 0 0 |
| B | BLANK | 1 | 5 | 0 1 1 0 |
| R | B | 2 | 6 | 0 1 0 1 |
| I | R | 2 | 2 | 1 1 0 |
| C | I | 0 | 2 | 1 1 0 |
| E | C | 2 | 9 | 0 0 1 1 0 0 |
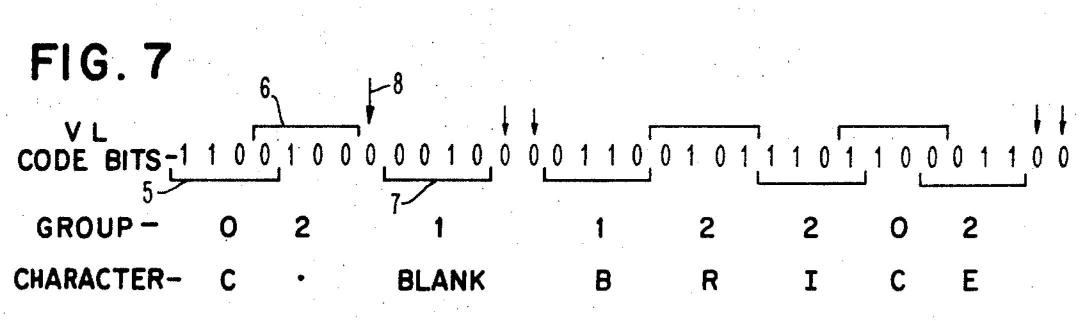
FIG. 7
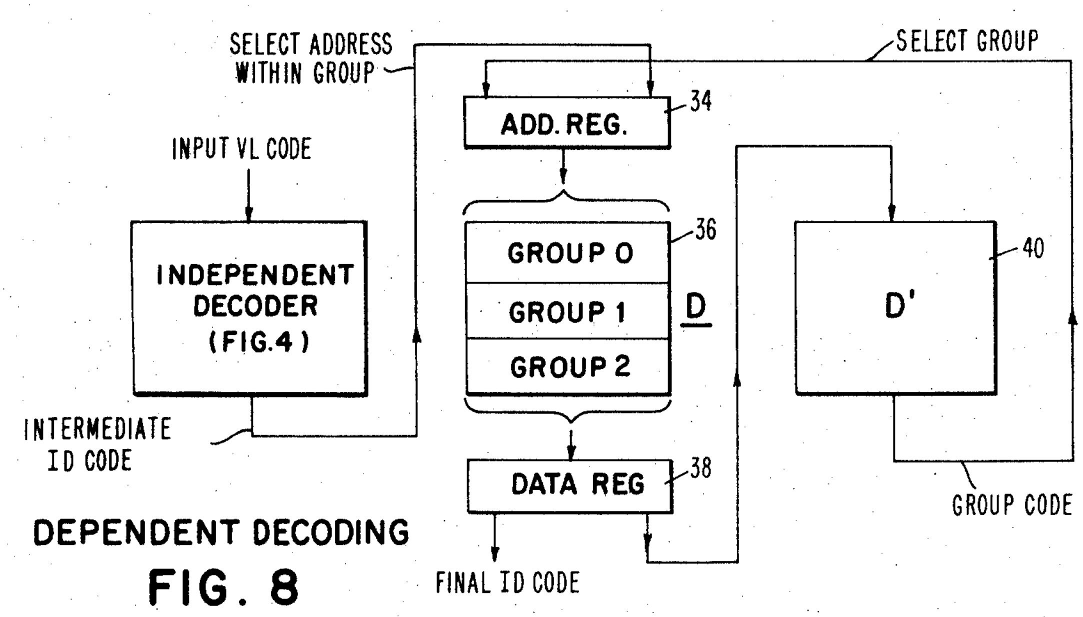
DEPENDENT DECODING
FIG. 8

FIG. 9

D

| | ADDRESS | I D CODE | CHAR. |
|---|---|---|---|
| GROUP 0 | 0 | 1 1 0 0 0 | Y |
| | 1 | 1 1 0 1 0 | BLANK |
| | 2 | 0 0 0 1 0 | C |
| | 3 | 0 0 1 0 0 | E |
| | 4 | 0 0 0 0 1 | B |
| | 30 | 0 1 0 1 1 | L |
| GROUP 1 | 31 | 1 0 0 0 1 | R |
| | 32 | 0 1 0 0 1 | J |
| | 33 | 1 0 0 0 0 | Q |
| | 34 | 1 0 0 1 0 | S |
| | 35 | 1 1 0 1 1 | ? |
| | 36 | 1 1 1 0 1 | # |
| | 37 | 0 0 0 0 1 | B |
| | 38 | 1 0 1 0 0 | U |
| GROUP 2 | 63 | 0 1 0 0 0 | I |
| | 64 | 0 0 1 1 0 | G |
| | 65 | 1 0 1 0 0 | U |
| | 66 | 0 1 0 0 0 | I |
| | 67 | 0 0 0 1 0 | C |
| | 68 | 0 0 0 1 1 | D |
| | 69 | 1 0 0 1 1 | L |
| | 70 | 1 0 0 0 1 | R |
| | 71 | 1 1 1 0 0 | . |
| | 72 | 1 1 0 0 1 | Z |
| | 73 | 0 0 1 0 0 | E |
| | 93 | 0 0 0 0 0 | A |
| | 94 | 0 1 1 1 0 | O |
| | 95 | 1 0 0 0 0 | Q |

D'

| ADDRESS | GROUP CODE |
|---|---|
| 0 | 0 0 |
| 1 | 1 0 |
| 2 | 1 0 |
| 3 | 1 0 |
| 4 | 0 0 |
| 5 | 1 0 |
| 6 | 1 0 |
| 7 | 1 0 |
| 13 | 1 0 |
| 14 | 0 0 |
| 15 | 1 0 |
| 16 | 1 0 |
| 17 | 1 0 |
| 18 | 1 0 |
| 19 | 1 0 |
| 27 | 0 1 |
| 28 | 0 1 |
| 29 | 0 1 |
| 30 | 0 1 |
| 31 | 0 1 |

FLOWCHART FOR INDEPENDENT DECODER

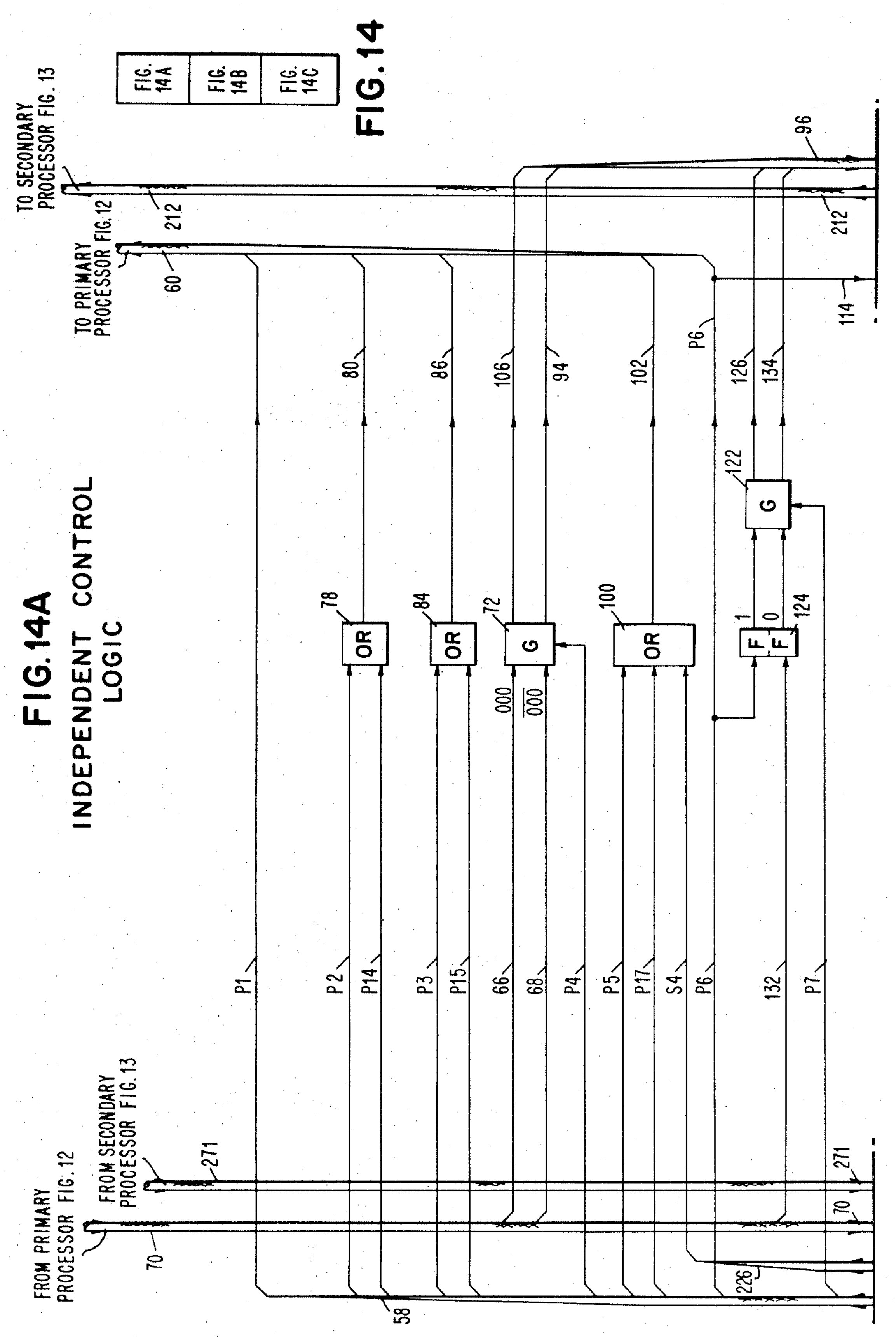
FIG. 14A INDEPENDENT CONTROL LOGIC, FIG. 14

SECONDARY PULSE GENERATOR

BLOCK DIAGRAM OF DEPENDENT DECODER

FIG. 18 FLOWCHART FOR DEPENDENT DECODER

METHOD OF AND APPARATUS FOR DECODING VARIABLE-LENGTH CODES HAVING LENGTH-INDICATING PREFIXES

BACKGROUND OF THE INVENTION

The compaction of data while it is being transmitted or held in long-term storage may be accomplished by variable-length coding. A coding scheme of this type will cause bit strings of fixed length to be encoded into bit strings of variable length, with the more commonly occurring codes being represented by bit strings having lengths shorter than those of the fixed-length codes. If the assignment of variable-length codes is judiciously done, the average length of such codes in a given data base will be much less than that of the corresponding fixed-length codes, even though many of the variable-length codes are much longer than the corresponding fixed-length codes.

While variable-length coding is useful for achieving data compaction, any data which is encoded in that form must be converted back into a fixed-length code form before it can be utilized by a data processor. Decoding schemes for this purpose have been proposed, but they have required special hardware of a type that ordinarily is not available in conventional data processors. There is need at the present time for a convenient way to handle variable-length codes in conventional data processors without requiring the use of unconventional hardware and without causing any significant loss of time in the processing of such data.

SUMMARY OF THE INVENTION

An important object of the present invention is to enable data which has been compacted by variable-length coding to be handled readily by data processors whose decoding facilities are designed to handle only fixed-length code bit strings which are much shorter than some of the variable-length code bit strings. A further object is to accomplish the decoding of these longer code bit strings at about the same rate as the shorter code bit strings.

To carry out these objectives, it is herein proposed to use variable-length codes which are formed under novel constraints and to process these codes in a novel manner whereby they are usable in a data processing system whose memory units and registers are adapted to handle data in the form of conventional fixed-length codes. According to one version of this novel concept, each variable-length code whose length exceeds a fixed number of bits, N, is processed in two parts, the first of which is an N-bit prefix herein designated the "length prefix". No two codes of unequal length have the same length prefix. Within the same length group, however, there may be more than one possible N-bit prefix configuration. The N-bit prefix in each instance identifies the code length uniquely. However, the prefix itself need not indicate the actual length value; it merely symbolizes this value.

In decoding variable-length codes whose lengths exceed N bits, the N-bit length prefix first is decoded in one decoding table to yield a base address in another decoding table, and the remaining bits of this variable-length code are interpreted as a displacement value for locating a specific address in the second table at which the decoded word is found. The number of these remaining bits is determined as an incident to the decoding of the N-bit prefix. While the final decoding step is being performed in the second table, the decoding of the next succeeding variable-length code may be initiated in the first table, so that no significant time is lost in decoding a variable-length code exceeding N bits in length despite the fact that the input information is processed in only fixed-length bit strings (i.e., N bits at a time). Hardware units of conventional types may be utilized in both the encoding and decoding processes according to this scheme without significantly degrading the performance of the system as a whole.

The above-described concept of using a prefix portion of a coded bit string to designate a base address and then using the following bits of the string to denote a displacement address with respect thereto is further extended herein to the principle of using each decoded output to determine the location in a decoding table which will be addressed to produce the next decoded output, thereby achieving further data compaction. This technique likewise uses conventional type hardware. Let it be assumed that in a given data base the letter U, for example, will occur much more frequently following the letter Q than it would otherwise, and that Q seldom occurs without being followed by U. If each character were being encoded and decoded individually without reference to any other character in the data base, the letter U might be assigned a variable-length code of fairly great length, since it occurs infrequently in the data base as a whole. However, if one were to analyze the frequency with which U occurs in combination with other characters in that data base, it may be found that the letter Q is usually followed by the letter U. Hence, if a special encoding table were set up exclusively for character pairs wherein the first character always is Q, those pairs containing the letter U as the second character will have the highest frequency of occurrence and consequently would be assigned the variable-length code of shortest length in that table. By utilizing this principle, one may at different times assign codes of different lengths to the same character according to the identity of the character which immediately precedes it in each particular instance. This type of operation, in conjunction with the one previously described, affords additional opportunities for compaction of data without requiring the provision of hardware of a type different than that which presently is used in conventional data processors.

In the case of those variable-length codes whose lengths do not exceed N bits (i.e., those codes of more frequent occurrence that are too short to have length prefixes), the decoding process is performed directly in one step by a novel table lookup procedure which assumes that all memory locations addressable by any N-bit combination containing a given variable-length code as its leading portion will yield the same fixed-length code output. As each variable-length code in the N-bit address register is decoded, the contents of this register are shifted by the length of the code, in response to a length value read out of the decoding table, thereby bringing the next succeeding variable-length code into the leading position for addressing the table.

DESCRIPTION OF DRAWINGS

FIG. 2 is a table exemplifying a novel form of Huffman coding wherein those codes which exceed a certain prefix length (4 bits in this case) are constrained so that the prefix portion of such a code uniquely designates the code length.

FIG. 5 is a table showing an exemplary dependent encoding scheme wherein the coding of each character depends upon that of the preceding character.

FIG. 6 represents in tabular form an example of dependent coding.

FIG. 7 represents the bit stream which results from the coding example of FIG. 6 and the manner of analyzing such a bit stream in accordance with the invention.

FIG. 8 is a diagrammatic representation of the processor employed in a dependent decoding scheme, which employs as one of its components the independent decoder shown in FIG. 4.

FIG. 9 represents the tables D and D′ employed in the dependent decoder (FIG. 8) for decoding information which has been encoded according to the scheme shown in FIG. 5.

GENERAL DESCRIPTION (FIGS. 1–9)

Figure 1:
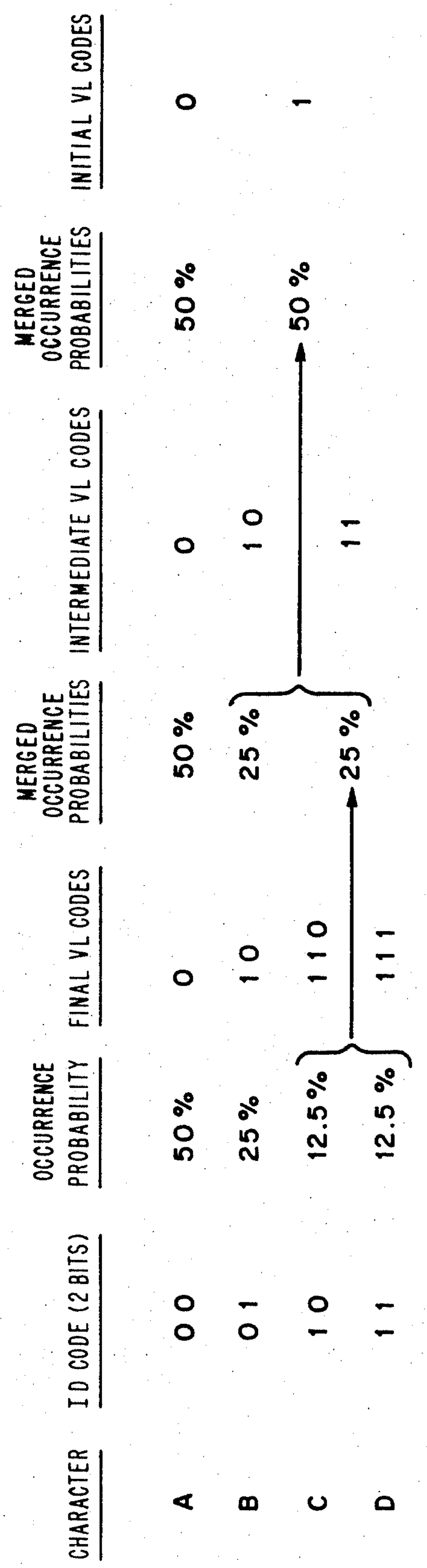
FIG. 1 is a table showing a simple example of conventional Huffman coding for converting fixed-length codes to variable-length codes.

For an adequate understanding of the invention, some preliminary knowledge of variable-length coding is essential. One of the well-known types of variable-length coding is Huffman coding, a very elementary example of which is shown in FIG. 1. With some modification (which will be explained hereinafter), this is the type of coding employed in the present illustrative system. In this example, it is assumed that the entire data base under consideration contains only four different characters, A, B, C and D, which are arranged in various ways for representing information that is to be transmitted or stored. It is further assumed that in this data base the character A is employed most frequently, with exactly one-half of all the characters in the data base being A's. Next in order of frequency (in this particular example) is the character B, with one-quarter of the characters in the assumed data base being B's. The remaining characters are C's and D's, each of which is assumed to constitute one-eighth of all the characters used in the data base.

Since there are only four different characters, any of these characters may be represented in ordinary fixed-length code notation by a distinctive two-bit code word. Thus, by way of example, A may be represented by the bit pair 00, B by 01, C by 10 and D by 11 in the assumed two-bit fixed-length code notation. In the description which follows, the fixed-length codes often will be referred to as the "ID" or "identity" codes; that is to say, they are identical with codes that are used in a conventional data processing system.

If it is desired to achieve data compaction, then the characters A, B, C and D, rather than being represented by fixed-length codes which invariably consist of two bits each, are represented instead by codes having variable-length bit strings containing from one to three bits each. The lengths of such bit strings are inversely related to the frequency with which the respective codes are used. By properly assigning these variable-length (VL) codes to the respective characters, the average length of the code words utilized to represent characters drawn from this data base may be made less than two bits, thereby saving transmission time and storage space in the handling of such data prior to its utilization by a conventional data processor.

The Huffman coding principle now will be explained with reference to the simple example shown in FIG. 1. To encode the characters A, B, C and D in the Huffman code notation, these characters first are ordered in decreasing probability of occurrence, as indicated in FIG. 1 by the vertical arrangement of A, B, C and D in that order from top to bottom. The code is constructed by adding the probabilities of the least probable two and merging the result in the probability list of the others (bottom merge) and then continuing this procedure by always merging the two smallest probabilities until there are only two probabilities left. Now the procedure works backward from right to left, first assigning VL codes 0 and 1 to the two probabilities that remained after the bottom merging process just described. Then, the VL codes 10 and 11 are assigned respectively to the two preceding probabilities that were combined to produce the probability to which 1 was just assigned. This procedure then continues in this fashion until a VL code is obtained for each of the four characters A, B, C and D from which the assumed data base is built.

As a result of this coding process, the most frequently used character A now is represented by a single-bit VL code 0; the next most frequently used character B is represented by a two-bit VL code 10; while the two least frequently used characters C and D respectively are represented by three-bit VL codes 110 and 111, as indicated in FIG. 1. These variable-length codes are prefix-free, which is to say that none of these codes can form the beginning of a longer code in that set. Multiplying the code length of each character by the probability of occurrence of that character and then adding the results will give an average code length of 1.75 bits per character, which is less than the two-bit length of the ID codes for those characters. Thus, data compaction has been achieved by this variable-length coding process.

It should not be concluded from the example just given that the Huffman-coding of any particular data base necessarily will cause the most frequently occurring code to have a length of only one bit. The assignment of variable-length codes to the different characters or other data elements making up a given data base will depend upon the particular relationship of their respective occurrence probabilities. In some cases the occurrence probabilities may be so finely graduated that many different characters are represented by codes having the same length.

In Huffman coding, no code may form the beginning of a longer code. However, two different codes of the same length may have a prefix portion in common. In FIG. 1, for example, the three-bit codes 110 and 111, respectively representing the characters C and D, have identical two-bit prefix portions 11. Also, in normal Huffman coding, codes of different lengths may have common prefix portions, provided this prefix portion does not constitute an entire code word. Thus, in FIG. 1, the codes 10 and 110, respectively representing B and C, share the one-bit prefix 1.

In order to practice the invention, a special constraint is imposed upon the Huffman coding process so that no two codes of different lengths exceeding N bits will share the same N-bit prefix, where N is a fixed number representing, for example, the number of input code bits that can conveniently be processed at one time by the available memory hardware. This constraint will reduce somewhat the degree of compaction that may be attained, but the disadvantage is small in comparison with certain advantages (to be described herein) that are realized by fulfilling this condition. With these constrained variable-length codes, each N-bit prefix is uniquely assigned to a particular code length. This greatly facilitates the type of decoding process which is herein contemplated, because it enables codes longer than N bits to be conveniently decoded by apparatus that can process only N bits at a time.

A specific example of constrained variable-length coding is given in FIG. 2. In this example the data base is assumed to contain 32 different characters, normally represented by ID codes having a fixed length of five bits. These 32 characters may consist, for example, of the 26 alphabetic characters and six nonalphabetic characters, such as ?, ., $, +, * and space or blank. The occurrence probabilities of the respective characters are assumed to be such that their constrained Huffman codes will vary from three bits to eight bits in length. In the present example the length of the prefix N is assumed to be four bits. (N does not necessarily have to equal the length of an ID code). For a code word having a length of four bits or less, the four-bit prefix will include the entire code word and perhaps some part of the next succeeding code word. In such instances the four-bit prefix is not treated as a length prefix. Where the code length exceeds four bits, the first four bits uniquely identify the code length.

Referring again to the code table shown in FIG. 2, which is constructed according to the novel coding concept just described, 32 variable-length (VL) codes representing the 32 different characters used in this assumed data base are tabulated along with their corresponding code lengths, four-bit prefixes and fixed-length ID codes. Only in the case of those VL codes whose lengths are five bits or more are the four-bit prefixes treated as "length prefixes." For a shorter code, the four-bit prefix shown in the table (which in some instances may include a bit from the succeeding VL code) has no length significance. Where the code word is less than four bits long, the four-bit "prefixes" shown in the table represent all possible four-bit configurations which may include that code word as their common leading portion.

As mentioned above, the four-bit length prefix of a longer code word (i.e., one whose length exceeds four bits) need not be a direct numerical representation of code length. The only requirement is that this prefix must represent a particular code length and none other. It should be noted, however, that a given code length may be represented by any of several length prefixes, each representing that particular code length and none other. For example, in the table of FIG. 2, code words having lengths of six bits may have any of the length prefixes 0011, 0001 and 00110, all of which are reserved exclusively for six-bit code words.

Figures 3, 4:
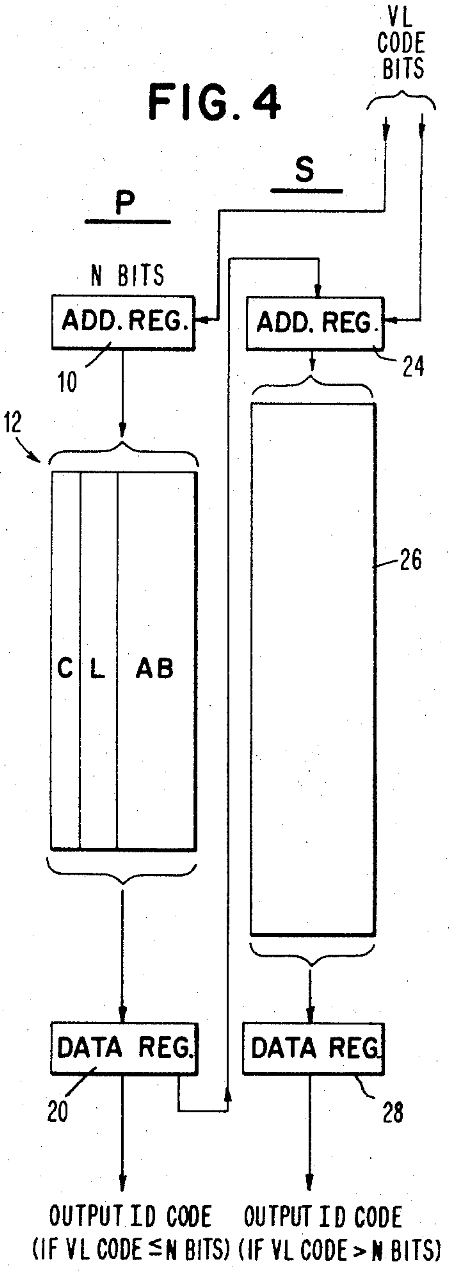
FIG. 3 is a representation of decoding tables stored in a primary processor P and a secondary processor S for decoding variable-length codes that have been generated in accordance with the coding scheme shown in FIG. 2.
FIG. 4 is a diagrammatic representation of a decoding scheme showing the manner in which the primary and secondary processors P and S are employed to decode individual variable-length codes independently of one another, this mode of operation being referred to herein as "independent decoding" to distinguish it from "dependent decoding" (shown in FIG. 8), wherein the process of decoding each variable-length code is conditioned by the result of decoding the preceding variable-length code.

FIG. 3 diagrammatically represents the layout of tables in a primary processor P and a secondary processor S for decoding characters which have been encoded according to the constrained Huffman coding scheme represented in FIG. 2. FIG. 4 shows in a general way the relationship between these two processors. The N-bit prefixes of all encoded variable-length character representations are decoded by primary processor P. If an input code has a length not exceeding N bits, (assumed to be four bits in the present example) the processor P furnishes the final decoded output. If an input code has a length exceeding four bits, decoding is performed in two stages. In the first stage of the decoding process, the length prefix (first four bits) of the input code is decoded to obtain a base portion of an address in the secondary processor S. To this base address portion there may be added a displacement value represented by the remaining digits of the input code. The final decoded output, a five-bit ID code, is found at the address specified by the combination of these two address portions. The combining of these address portions need not involve an arithmetic adding operation. It can be achieved by serial feeding and shifting of address bits, as will be explained.

Structurally, the primary and secondary processors P and S, FIGS. 3 and 4, may be composed of conventional type memory units (or parts of conventional memory units) that are specially allocated to these decoding functions. Although the hardware may be of conventional type, however, the manner of operating these memory units to achieve the results described herein is unique. In order to carry out the present inventive concept, the table stored in primary processor P has three fields, respectively designated AB, L and C. The AB field stores fixed-length codes which (depending upon the length of the input VL code) will constitute in some instances the decoded ID output and in other instances a partially decoded address for processor S. The L field stores binary representations that are related to the respective code lengths. In the present example, L is numerically one less than the code length in the case of all codes whose lengths do not exceed four bits (N being four bits in this example). Where the code length exceeds four bits, L is numerically 1 less than the difference between the code length and four bits. The C field of processor P stores a one bit if the code length exceeds four bits, and it stores a 0 bit if the code length does not exceed four bits.

The processor S, FIGS. 3 and 4, contains a table of the various five-bit ID codes corresponding to all of the VL codes whose lengths exceed four bits. 25 of the 32 possible ID codes are stored in table S. The remaining seven ID codes are stored in table P, since they are respectively assigned to the seven VL codes whose lengths do not exceed four bits. Referring again to table S, the ID codes are arranged in groups. Those ID codes which are stored in locations 0 through 10 correspond respectively to the 11 possible VL codes whose lengths are eight bits (FIG. 2). Those ID codes which are stored in locations 12 through 23 of table S correspond respectively to the 12 VL codes whose lengths are six bits. The ID codes stored in locations 24 and 25 of table S correspond respectively to the two possible VL codes whose lengths are five bits. The remaining addresses in table S are not used in this particular example. The significance of these particular ID code groupings in table S will become more apparent as the description proceeds.

A few exemplary decoding operations now will be described with reference to FIGS. 2, 3 and 4. As a first example, assume that the input VL code is 001001. The first four bits, 0010, constitute the length prefix, since N = 4. In this particular coding scheme the prefix 0010 uniquely identifies the code length as six bits. This four-bit prefix is serially fed to a four-bit address register 10, FIG. 4, where it addresses a location in the memory unit 12 of primary processor P corresponding to number 2 in the P table, FIG. 3. At this memory location, the AB field stores the binary representation 00100; the L field stores the binary representation 01; and the C field stores a one bit, indicating an input code length greater than four bits. A two-step decoding operation is called for. In the first step, the AB field entry 00100 is read out to a data register 20, from which it is transferred to a five-bit address register 24 in the secondary processor S, FIG. 4. The L field entry 01 is read out and is incremented by 1 to indicate the number of additional VL code bits to be fed into register 24. In this instance two more VL code bits are needed, these being the two remaining low-order bits 01 of the input VL code 001001. As these additional two bits enter register 24 from the low-order end, the existing contents of register 24 are shifted two bit positions toward the high-order end of this register, causing the two highest-order bits 00 of the initial address 00100 to drop out. As a result of this serial feeding and shifting process, the register 24 now stores the binary address 10001, or 17 in decimal notation. At location number 17 of table S, FIG. 3, the five-bit ID code 10010 is found. This is read out of the secondary processor memory 26, FIG. 4, to a data register 28, where it is retrieved as the output ID code corresponding to the input VL code 001001.

In the above example, when the AB field entry 00100 that was read out of memory 12 subsequently was transferred from data register 20, FIG. 4, to address register 24, then shifted two places to the left in register 24, this effectively pointed to a base address of 10000 (or 16) in the memory 26 of secondary processor S. However, at the time when this leftward shift occurred, the two remaining bits 01 of the VL code were appended to the truncated bit string 100 that remained after the first two bits 00 were shifted out of register 24, so that the final address 10001 (or 17) was displaced by 1 from the base address. The same result could have been achieved by reading from field AB of the primary processor memory 12 a value 10000 that directly represented a base address and then arithmetically adding to it the displacement value 00001, without shifting the contents of address register 24. It is preferred, however, to operate in the manner described above since this avoids an arithmetic addition.

As soon as the contents of data register 20 have been transferred to address register 24, and the remaining bits of the current VL code have been shifted into register 24, the decoding of the next succeeding VL code may be commenced by feeding the bits of this new VL code into register 10. Thus, while the secondary processor S is working to complete the decoding of one VL code, the decoding of the next VL code may commence in primary processor P. In this way it is possible to decode input VL codes whose lengths are greater than N bits at about the same rate as VL codes whose lengths do not exceed N bits, despite the fact that the longer codes require an additional or secondary decoding step.

There will be described now an example in which the input VL code has a length of only three bits, or one bit less than N. Assume that this VL code is 110. Since the address register 10 has four bit positions, it will store the incoming three-bit code 110 in its three highest-order positions, and the fourth position will be filled by the first bit of the next succeeding VL code (which could be 1 or 0). In view of this, it is necessary to arrange memory 12 so that the output ID code in this case may be found at either of two binary addresses, 1100 or 1101, i.e., at either address number 12 or 13 of table P, FIG. 3. In either event, the five-bit code 00010 is read out to the data register 20 as the ID code corresponding to the three-bit VL code 110. The C field in this instance stores a zero bit, indicating that no secondary decoding operation will be required. The L field stores the binary representation 10 (or 2) which, when incremented by 1, indicates the number of bits (three) be shifted out of address register 10 in order to bring the next succeeding VL code into proper registry for decoding.

The decoding process which has been described thus far with reference to FIGS. 2–4 treats each input VL code or character as an individual entity that is to be decoded without reference to any other code or character in the incoming stream of information. This kind of operation will be called "independent decoding", since it is performed independently of the decoding operation performed upon any neighboring character. As pointed out hereinabove, however, it often is possible to achieve higher degrees of data compaction by processing the input characters in sets (for example, in pairs). Thus, for instance, the character U, if encoded independently of adjoining characters, may have a rather lengthy VL code, but if encoded in combination with its preceding character, it will have a very short VL code whenever it is preceded by a consonant such as Q. It is advantageous, therefore, to encode and decode characters in sets rather than singly. Such encoding and decoding operations will be referred to herein as "dependent" encoding and decoding. Dependent encoding or decoding can utilize the same apparatus as that required for independent encoding or decoding, together with some additional apparatus for performing a few additional functions that are needed in this mode of operation.

FIG. 5 is a tabular representation of a dependent coding scheme which has been set up for an exemplary data base containing 32 different characters (26 alphabetic characters plus six nonalphabetic characters: blank, ?, ., $, + and *). Each of these characters may at any given instant be classified into any one of three groups 0, 1 and 2 according to the character which preceded it in the portion of the record or message under consideration. For illustrative purposes these three groups are defined as follows:

- Group 0 contains the first character of a record and any character following a vowel.
- Group 1 contains any character following a nonalphabetic character (blank, ?, ., $, + or *).
- Group 2 contains any character following a consonant.

The encoding of a character involves, first, classifying it in the appropriate group 0, 1 or 2, as defined above, according to the type of character which preceded it. Within each of these groups, the character to be encoded will be given a certain number (as shown in FIG. 5) to denote how it is ranked with respect to other members of that group on an occurrence probability basis. The lower this number is, the higher will be the occurrence probability of that character within this particular group. The number assigned to the character then determines the variable-length code which is assigned to it, according to the table set forth in FIG. 2.

The coding principle just described can best be illustrated by an example. Assume that the name "C. BRICE" is to be encoded in the dependent coding scheme. FIG. 6 illustrates how this name is encoded in accordance with the table in FIG. 5. The first character C, not being preceded by any other character, is classified in Group 0, and it is ranked as number 2 in that group. To find the VL code which is assigned to this character, reference now is made to the "independent" encoding table shown in FIG. 2, where it is seen that character number 2 is represented by the VL code 110. A similar procedure is followed in the case of the succeeding characters, and the resultant assignment of VL codes to the exemplary set of characters is shown in FIG. 6. When the encoded name "C. BRICE" is transmitted or read out of storage, it will appear as the sequence of VL code bits shown in FIG. 7.

To recapitulate, in dependent coding each VL code is selected on the base of (1) the type or identity of the character which preceded the character that currently is being encoded (e.g., whether it is a vowel, consonant or nonalphabetic character) and (2) the probability that the current character will follow such a preceding character in the data base that is being used. All of these occurrence probabilities have to be determined beforehand for the particular data base under consideration. The probability ranking of the character within its group (FIG. 5) determines its VL code assignment according to the table shown in FIG. 2.

As one pecularity of dependent coding, it will be noted that the same VL code may at different times represent different characters. Thus, in FIG. 6, for example, the VL code 110 in one instance represents the character I and in another instance the character C, these two characters being in different groups.

To decode a sequence of VL code bits that has been formed in the dependent mode, as shown in FIG. 7, for example, each character in the sequence first is regarded as though it has been encoded in the independent mode (FIG. 2), and it is decoded accordingly. The output of this independent decoding process is not used directly, however. It is further decoded in a manner determined by whatever character may have preceded it in the sequence, and the final output is the result of this further decoding operation. This mode of operation may be understood more readily by referring to FIG. 8, which represents in a general way the dependent decoding process, and to FIG. 9, which fragmentarily represents the layout of the decoding tables D and D' utilized in the dependent processor.

In FIG. 8, the independent decoder of FIG. 4 is represented as performing the initial decoding function of the dependent decoding process. The output of the independent decoder is an ID code which serves an intermediary function in obtaining the final ID code. This intermediate ID code (5 bits in the present example) is stored in the low-order positions of an address register 34 associated with a memory 35, within which is stored the table D (FIG. 9).

Initially the high-order positions of register 34 are filled with zeros, and the first item read out of memory 36 in any new decoding run will be an ID code stored in Group 0. For example, the first character C in the example of FIG. 6, having a VL code 110, will be decoded into the ID code 00010 by the independent decoder, FIGS. 3 and 4. This ID code is placed in the five lowest positions of register 34, and since the highest positions (two in number) presently are filled with zeros, the resulting address is 0000010, or 2. Referring to FIG. 9, the address 2 in table D stores the ID code, 00010, which then becomes the final ID code read out to the data register 38, FIG. 8. It so happens in this instance that the intermediate and final ID codes are identical, but this is not generally true.

In decoding the next VL code 01000, which represents the character "." in the present encoding scheme (FIGS. 5 and 2), the independent decoder yields the intermediate ID code 00111. This now is placed in the five lowest positions of address register 34, FIG. 8. Meanwhile, the previous ID code read out to the data register 38 (00010, representing the preceding decoded character C) becomes the address for a lookup operation performed in a table D' (FIG. 9) which is stored in memory 40, FIG. 8. At this address (00010, or 2) in table D', the two-bit group code 10 is stored. This group code 10 now is placed in the two highest positions of address register 34, where it combines with the intermediate ID code 00111 in the five lowest positions to provide the seven-bit address 1000111, or 71. At address number 71 in table D (FIG. 9), the ID code is found to be 11100, which in the present coding scheme is assigned to character ".". This ID code 11100 then is read out to the data register 38 as the final ID code. It also is utilized as a new address (28) to look up in table D' the proper group code (01) for decoding the next succeeding VL code, as just described.

The foregoing description, explaining how the first two VL codes in the bit stream of FIG. 7 are decoded into the ID codes representing the characters C and ".", respectively, indicates the manner in which the remaining VL codes of this stream will be decoded in the dependent decoding scheme. FIG. 7 also indicates how the independent decoder breaks this bit stream up into its constituent VL codes. The horizontal brackets (such as 5, 6 and 7) in this Figure depict the four-bit "-windows" through which the primary processor P of the independent decoder (FIGS. 3 and 4) views the bit stream. The vertical arrows such as 8, FIG. 7, point to those bits in the stream which are utilized in the secondary processor S, in those decoding operations where it is necessary to use processor S. The bits which intervene between the left end of any window bracket and the left end of the succeeding window bracket (or the end of the stream, as the case may be) constitute the bits of a single VL code. Thus, between the left end of the first bracket 5, FIG. 7, and the left end of the next bracket 6 there lie the three bits 110 of the first VL code (FIG. 6) used n this particular example. Between the left end of bracket 6 and the left end of bracket 7 are the five bits 01000 of the second VL code, only four of which are within bracket 6. The arrow 8 points to the fifth bit, 0, that is utilized in the secondary processor S to complete the independent decoding operation upon this second VL code. FIG. 7 also denotes the group numbers assigned to the various codes during the dependent decoding process, as well as the final decoded characters.

The foregoing general description, which is based upon FIGS. 2–9, assumes an example in which there are only 32 different characters in the data base. This number of characters may be represented by five-bit ID codes and by VL codes that do not exceed eight bits in length. The prefix N thus far has been assumed to be four bits long. In practice, however, these parameters would not be convenient to use. Most data processing systems are designed to handle data in eight-bit units called "bytes". Hence it is more practical to think in terms of ID codes that are eight bits (one byte) in length. Also, to be useful, a data base must contain many more than 32 different codes. In such a system the VL codes will in many instances have lengths exceeding eight bits. These requirements were disregarded in presenting the above general description so as to avoid complicating this description. However, in the remaining portion of the description, dealing with exemplary embodiments of the invention, such practical operating conditions will be assumed.

DETAILED DESCRIPTION OF EXEMPLARY EMBODIMENTS

Exemplary embodiments of the independent and dependent decoding schemes are illustrated in FIGS. 10–21D. Unlike the simpler decoding schemes shown in FIGS. 3–9, they are designed on the following assumptions:

ID code length = eight bits

VL code length = one to 16 bits

Prefix N = eight bits

In principle, the apparatus shown in FIGS. 10–21D functions in the same manner as that shown in FIGS. 3–9 for decoding variable-length (VL) codes into corresponding fixed-length (ID) codes. Hence, the detailed description which follows will be more concerned with the specific functioning of the illustrated circuitry than with its underlying principle of operation, which is assumed to be understood from the preceding general description.

In presenting this detailed description, it will be assumed first that only independent decoding operations are to be performed, and such an operation will be described with reference to FIGS. 10–16. Subsequently a dependent decoding operation will be described with reference to the system shown in FIGS. 17–21D. The operation of the independent decoder necessarily is involved as a preliminary phase of this dependent decoding process.

INDEPENDENT DECODING (FIGS. 10–16)

Figure 10:
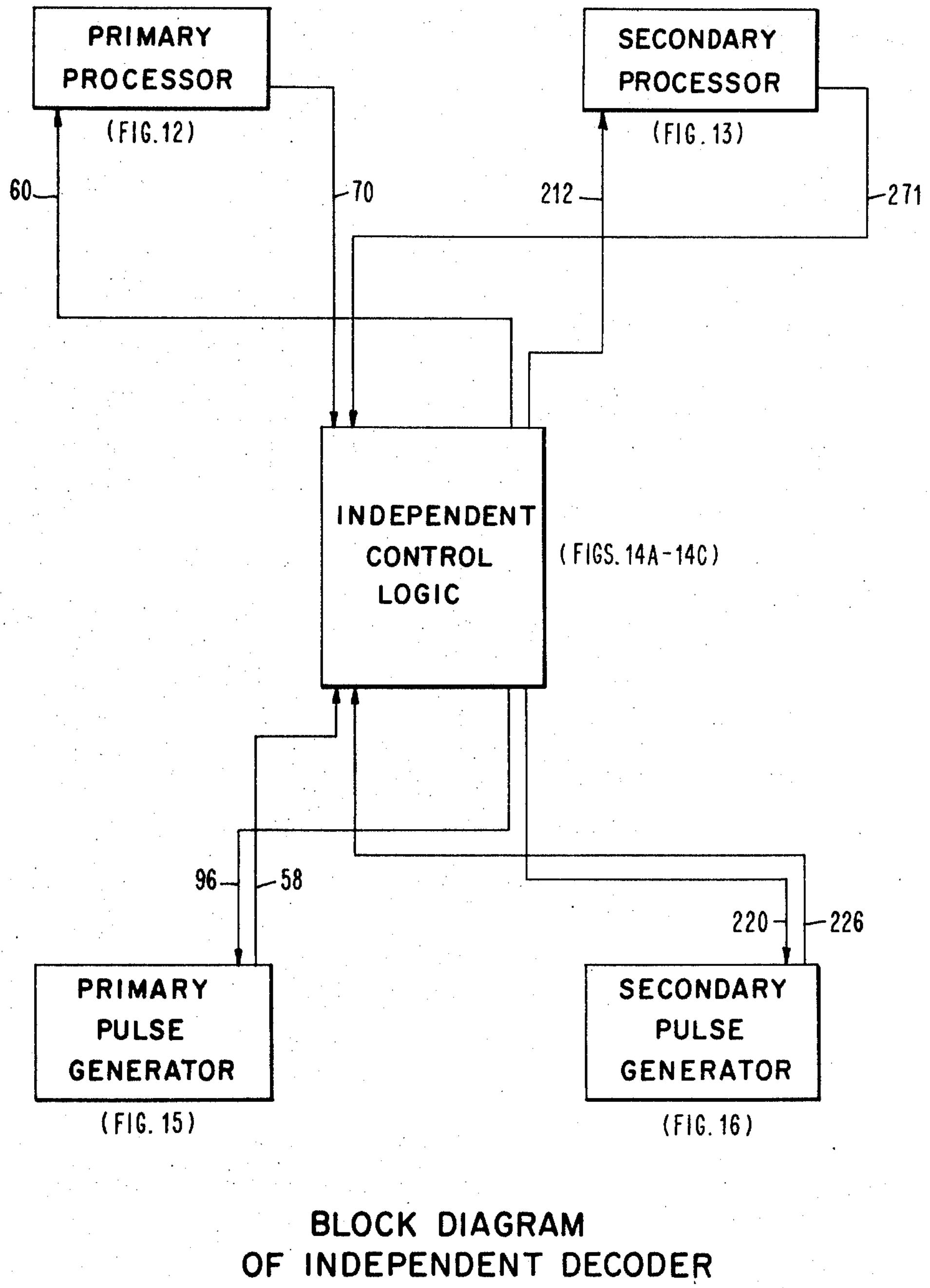
FIG. 10 is a general block diagram of the independent decoder as a whole, indicating its various components.

The apparatus for carrying out this function is shown generally in FIG. 10. It comprises a primary processor shown in FIG. 12 and the secondary processor shown in FIG. 13, the independent control logic shown in FIGS. 14–14C, the primary pulse generator shown in FIG. 15 and the secondary pulse generator shown in FIG. 16. Referring again to FIG. 10, the independent control logic operates in response to timing pulses furnished by the primary and secondary pulse generators to control the operations of the primary and secondary processors. The interactions of these various units now will be explained.

It will be recalled that in the present description the assumption is made that each ID code produced by the decoding process is eight bits or one byte in length. It will be assumed herein that the number of bytes of decoded information to be produced during a particular decoding run is known in advance. As the first step in the decoding operation, therefore, the total number of decoded bytes to be produced is entered into a byte counter 50, FIG. 14B. A pulse then is applied to a "-Start" wire 52 shown in FIG. 15, to initiate the decoding process.

Figure 11:
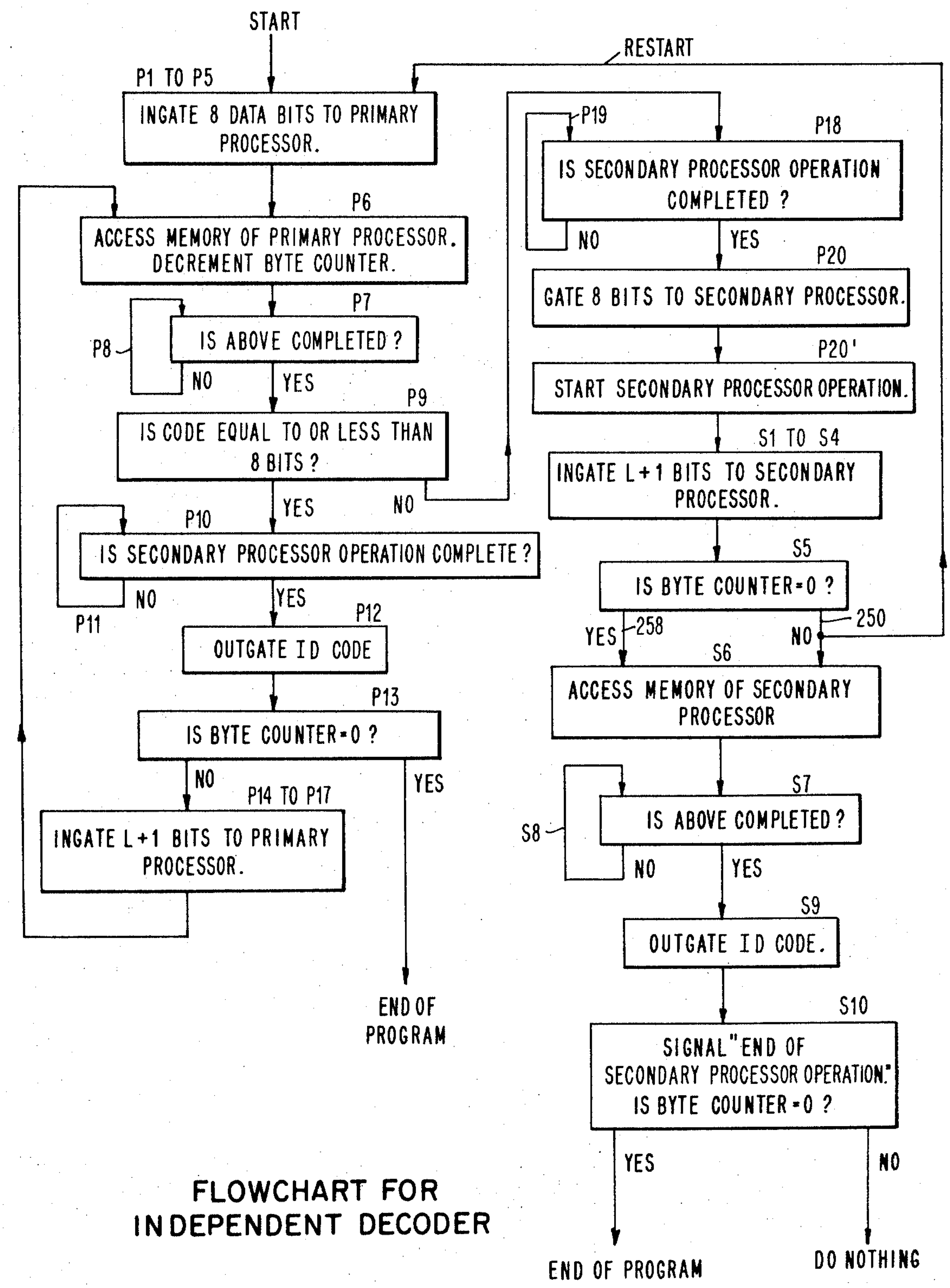
FIG. 11 is a flowchart of the independent decoding process which is carried out by the exemplary embodiment shown in FIGS. 12–16.

FIG. 11 shows the flowchart for the independent decoding process. The various boxes or steps in this flowchart are identified by reference characters such as P1, S1, etc. These same reference numbers also are applied to various wires leading from the respective single shot (SS) units of the primary and secondary pulse generators shown in FIGS. 15 and 16. The application of a pulse to any of these wires will initiate the step of the operation designated by the corresponding number in the flowchart of FIG. 11. Continual reference should be made to this flowchart in order to understand the operation of the circuitry herein described.

Figure 14B:
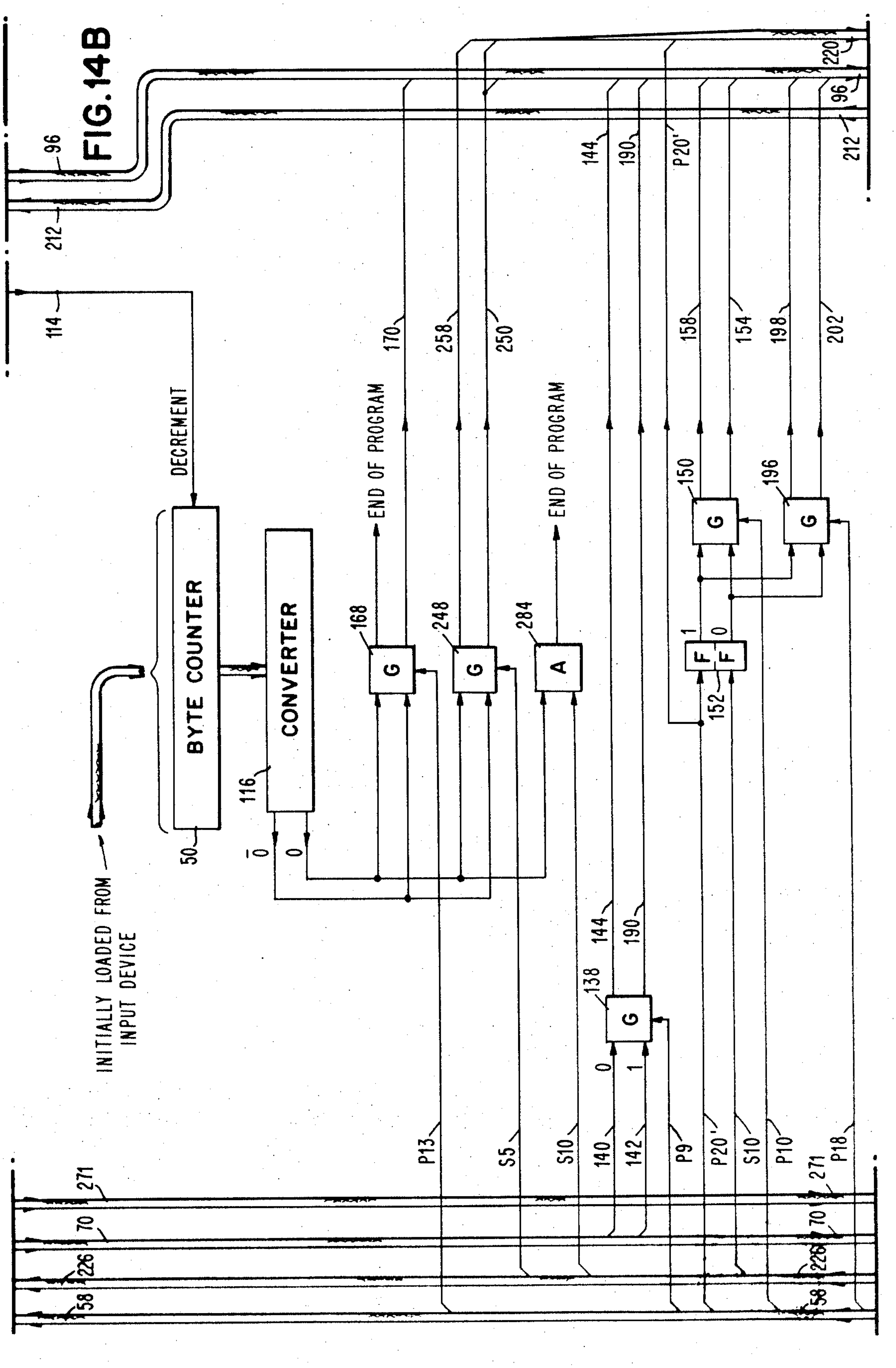
Figure 14C:
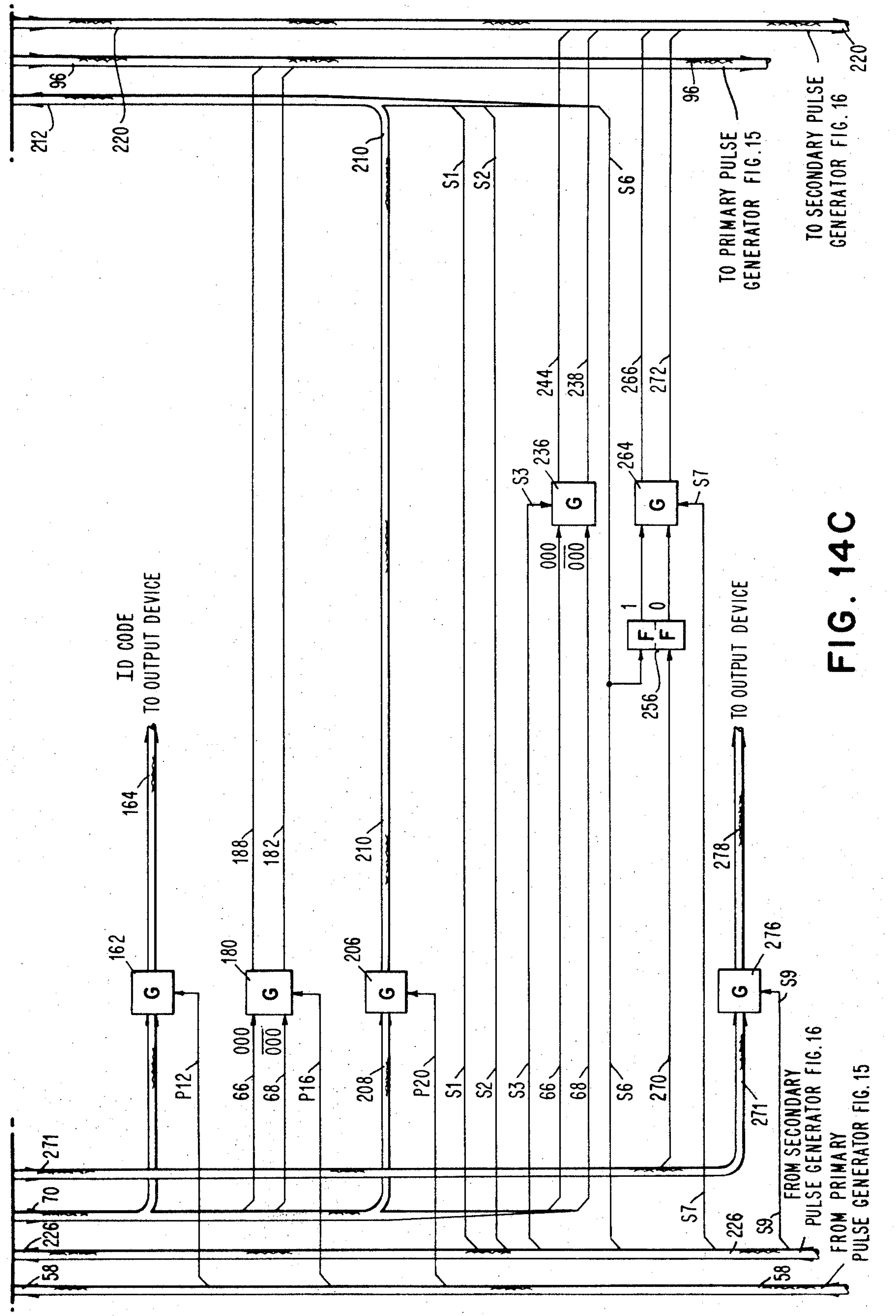
Figure 15:
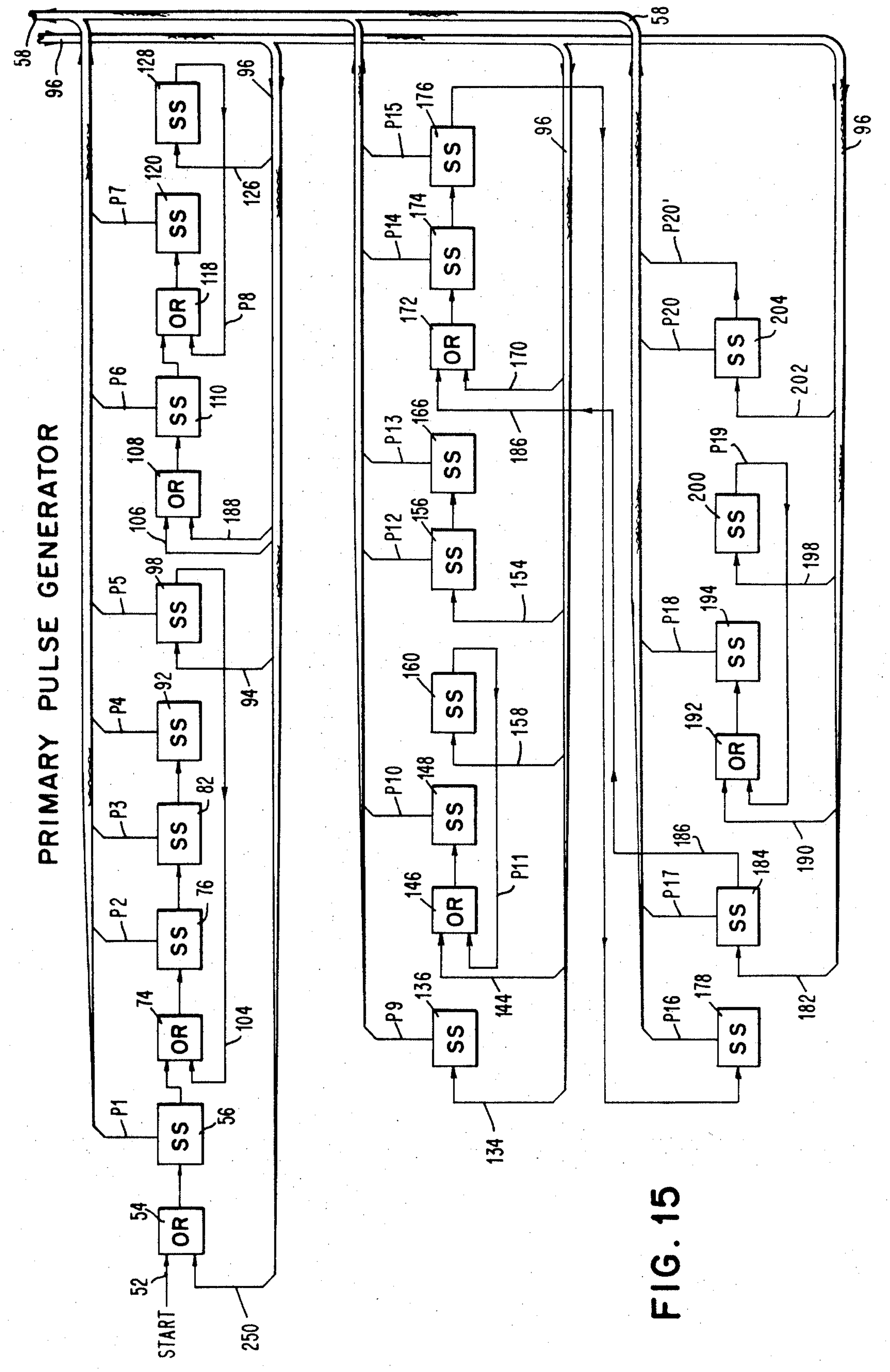

The "Start" pulse applied to wire 52, FIG. 15, is extended through OR circuit 54 to single shot 56. This initiates a subprogram consisting of steps P1–P5 (FIG. 11) for ingating or entering 8 bits of data to the primary processor. As single shot 56 goes on, it applies a pulse on a wire P1, which extends through cable 58, FIGS. 15, 14C, 14B and 14A and thence through cable 60, FIGS. 14A and 12, to a device for causing the binary quantity 111 (decimal 7) to be entered into a counter 62 in the primary processor, FIG. 12. This counter 62 actually is part of the data register 20, FIG. 4, associated with the primary processor P, and in subsequent operations it receives the length (L) representations that are read out of the memory 12. For this reason it will be referred to occasionally as the "length counter."

Figure 12:
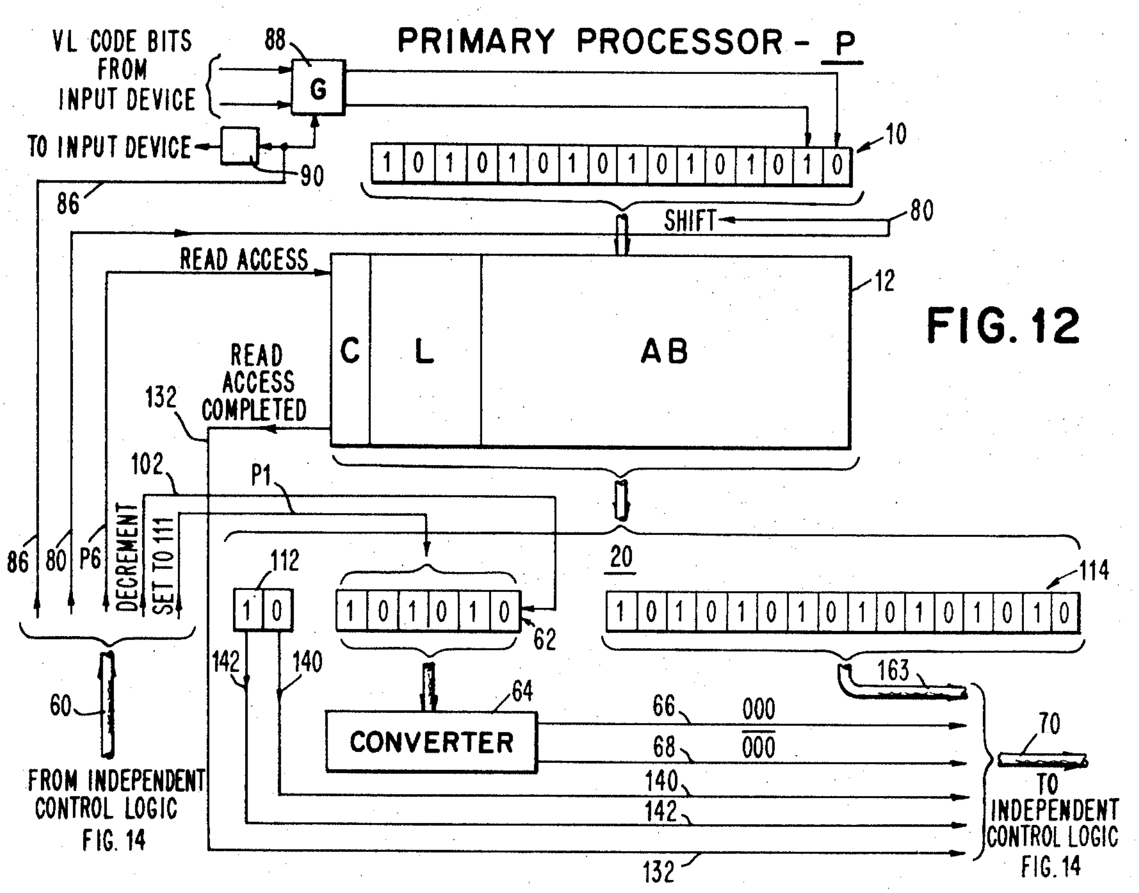
FIGS. 12–16 are detailed circuit diagrams of an independent decoder for carrying out the decoding process shown in FIG. 11.

The setting of counter 62, FIG. 12, is converted by the converter 64 into either a zero output on wire 66 or a not-zero output on wire 68. These wires 66 and 68 pass through the cable 70, FIGS. 12 and 14A, to a gate 72, which at the present time is not conditioned to pass signals.

When single shot 56, FIG. 15, goes off, it applies a signal through OR circuit 74 to single shot 76, which turns on to apply a pulse on wire P2 extending through cable 58, FIGS. 15 and 14C, 14B and 14A and thence through OR circuit 78, FIG. 14A, and wire 80 in cable 60, FIGS. 14A and 12, to a shifting device (not shown) for causing the contents of the address register 10, FIG. 12, to be shifted one bit to the left. This prepares the lowest-order position of register 10 (assumed here to have an eight-bit capacity) to receive an incoming bit.

When single shot 76, FIG. 15, goes off, it turns on a single shot 82, which puts a pulse on wire P3 that leads to OR circuit 84, FIG. 14A, and from thence the pulse passes through wire 86, FIGS. 14A and 12, to a gate 88 for enabling a new bit to enter the address register 10 at its low-order end. Concurrently with this action, energization is extended through delay device 90, FIG. 12, to the input device so that a new bit will be available for ingating the next time the gate 88 is pulsed.

When single shot 82 goes off, FIG. 15, it turns on the single shot 92, causing a pulse to pass through wire P4, FIGS. 15 and 14A, to the gate 72 mentioned hereinabove, to which the output of converter 64, FIG. 12 is applied. If the setting of counter 62 is not 000, circuit is extended through wire 94 in cable 96, FIGS. 14A, 14B, 14C and 15, to a single shot 98 for turning this single shot on. It will be assumed that this is the action that occurs in the present instance. As single shot 98 turns on, it applies a pulse through wire P5, FIGS. 15 and 14A, OR circuit 100 and wire 102, FIGS. 14A and 12, to a decrementing device for the counter 62. Such action causes the setting of counter 62 to be decremented by 1.

As single shot 98, FIG. 15 goes off, it extends circuit back through a wire 104 and the OR circuit 74 to single shot 76, again energizing this single shot. The above described steps associated with the successive energization of the wires P2, P3 and P4 then are repeated. As the P4 pulse is applied, the setting of counter 62, FIG. 12, again is tested, and if it is not 000, another cycle of steps P5, P2, P3 and P4 is executed. For convenience, the various actions associated with the generation of pulses P2 through P5 are set out below:

| | |
|---|---|
| P2 | Shift contents of argument register **10** one bit to left. |
| P3 | Ingate a bit from the input device to the lowest-order position of register **10**. |
| P4 | Test setting of counter **62**. If the setting is not 000, go to **P5**. If the setting is 000, go to **P6**. |
| P5 | Decrement the setting of counter **62** by **1**. Go back to **P2**. |

Ultimately, when 8 bits have been ingated to the address register 10, FIG. 12, the setting of counter 62 is reduced to 000. Under these circumstances, when the wire P4, FIGS. 15 and 14A, is pulsed to activate the gate 72, the 000 output from converter 64, FIG. 12, passes through wire 66, OR circuit 72, and wire 106 in cable 96, thence through OR circuit 108, FIG. 15, to single shot 110. This signifies that the 8 bits of data have been entered into the address register 10, and the primary processor now is ready to start decoding this information.

As single shot 110 goes on, FIG. 15, it pulses the wire P6 to initiate the corresponding step P6 in the flowchart, FIG. 11. Specifically, the pulse on wire P6 is extended through cables 58 and 60, FIGS. 15 and 12, to the means for executing a read access of memory 12 in the primary processor. This causes the information which is stored in memory 12 at the address indicated by register 10, to be read out to the data register 20. This data register 20 consists of three portions which respectively are associated with the C, L and AB fields of memory 12. The single bit read out of field C is entered into a flip-flop 112 which is part of register 20. The contents of the L field at the addressed location, assumed to be 3 bits of data in the present example, are entered into the counter 62, included in the register 20. The item read out of the AB field, consisting of an eight bit code, is stored in a code register 114, which is the third portion of the data register 20.

When wire P6, FIGS. 15 and 14A, was pulsed to initiate the readout action just described, this also caused a wire 114, FIGS. 14A and 14B, to be energized for decrementing the byte counter 50. It is assumed in the present instance that this action does not reduce the byte counter setting to zero. A converter 116, FIG. 14B, associated with byte counter 50 furnishes a zero or not-zero output in accordance with the byte counter setting. The effect of this output will be described presently.

When the single shot 110, FIG. 15, goes off it sends a pulse through OR circuit 118 to a single shot 120, which turns on to pulse the wire P7, FIGS. 15 and 14A. This conditions a gate 122 to pass the output of a flip-flop 124 whose setting indicates whether or not the read access operation performed in step P6 (FIG. 11) has been completed. If the setting of flip-flop 124 is 1, this indicates that the access is not completed and this causes a circuit to be extended through gate 122 and wire 126, FIGS. 14A and 15, to single shot 128, which turns on to extend circuit through a wire P8 and OR circuit 118 back to single shot 120. This ensures that single shot 120 will be maintained on until the read access operation is completed. When such operation is completed, the memory 12, FIG. 12, furnishes a signal on a line 132, FIGS. 12 and 14A, to reset the flip-flop 124 to zero. Gate 122 now passes the signal through a wire 134, FIGS. 14A and 15, to single shot 136 for initiating the next step (P9) of the operation.

As single shot 136 goes on it pulses the wire P9, FIGS. 15 and 14B, to activate a gate 138. There is supplied to the input of gate 138 through wire 140 or 142, FIGS. 14B and 12, the 0 or 1 output of flip-flop 112, which stores the single C bit. It will be recalled that when the C bit is 1, this indicates that the VL code which currently is to be decoded has a length exceeding 8 bits. If the VL code length does not exceed 8 bits, the flip-flop 112, FIG. 12, has a zero setting. For the present, it will be assumed that the current VL code does not exceed 8 bits in length, hence, the C bit is zero, and consequently wire 140, FIG. 12 and 14B, is energized. In this condition, the pulsing of wire P9 causes gate 138 to place a signal on wire 144, FIGS. 14B and 15, which extends through OR circuit 146 to single shot 148.

As single shot 148 goes on it pulses wire P10, FIGS. 15 and 14B, to activate a gate 150. The purpose of this action is to initiate a test to determine whether the operation of the secondary processor has been completed. In an instance where the secondary processor might have been called into operation for decoding a preceding VL code whose length exceeded eight bits, it is necessary to ensure that the secondary processor has completed its decoding operation before operation of the primary processor is resumed. In the present instance, it is assumed that there has been no previous operation of the secondary processor. Nevertheless, the test must be performed since it is part of the procedure. It is assumed that flip-flop 152, FIG. 14B, which indicates the setting of the secondary processor, has a zero setting. This causes a signal to pass through gate 150 and wire 154, FIGS. 14B and 15, to a single shot 156. In the event that the secondary processor had been in operation, however, the flip-flop 152, FIG. 14B, would have been at the 1 setting, causing a signal to pass through gate 150 and wire 158, FIGS. 14B and 15, turning on a single shot 160 for pulsing wire P11. This maintains energization on single shot 148 to continue the P10 pulse so long as the secondary processor is still operating.

Assuming now that the secondary processor is not in operation, and that single shot 156, FIG. 15, has been turned on, a pulse now is applied through wire P12, FIGS. 15 and 14C, to gate 162. The activation of gate 162 causes the ID code stored in portion 114 of the data register 20, FIG. 12, to be outgated through cables 163, 70 and 164, FIGS. 12 and 14C, to the output device. This is the output of a decoding operation performed by the primary processor P when the input VL code is eight bits or less in length.

When the single shot 156 goes off at the end of the outgating operation just described, it causes the next single shot 166 to go on for pulsing the wire P13, FIGS. 15 and 14B. This activates a gate 168 to perform a test for determining whether the byte counter setting has been reduced to 0. If it has, a signal is generated to indicate that the end of the program has been reached. If the byte counter setting is not 0, the operation proceeds to the next step. The not-zero signal from the decoder 116 passes through gate 168 to wire 170, FIGS. 14B and 15, and OR circuit 172 to single shot 174, which turns on to apply a pulse on wire P14. A series of steps P14 to P17, FIGS. 11–14, now is performed for the purpose of bringing the next succeeding VL code into position for decoding. This sequence of steps involves shifting the contents of address register 10, FIG. 12, leftward through a number of bit positions equal to the length of the VL code that just was decoded. Such action will bring the next VL code into the highest-order positions of register 10.

The application of a pulse wire P14, FIGS. 15 and 14A, extends energization through OR circuit 78 and wire 80, FIGS. 14A and 12, to the left shift device for the address register 10 in the primary processor P. The contents of register 10 thereupon are shifted one bit position to the left. As single shot 174, FIG. 15, goes off, it turns on single shot 176, which pulses the wire P15, FIGS. 15 and 14A. This pulse then passes through OR circuit 84 and wire 86, FIGS. 14A and 12, to the ingating means 88–90, thereby ingating a new VL code bit to the lowest-order position of address register 10.

As described hereinabove, when the memory 12 of the primary processor, FIG. 12, was accessed during step P6 (FIG. 11), the contents of the fields C, L and AB at the selected address were read out to the data register 20. At that time the L value became stored in counter 62, which is part of register 20. In the present embodiment, the value L is 1 less than the VL code length if such code length does not exceed eight bits. (The significance of L when the code length exceeds eight bits will be explained hereinafter). Thus, the counter 62, FIG. 12, now stores the L value of the VL code which has just been decoded and read out of the code register 114 (step P12, FIG. 11). This L value determines the number of leftward shifts that must be performed in the argument register 10 in order to bring the next succeeding VL code into the proper registry for decoding.

One leftward shift already has been performed in response to the energization of single shot 174, FIG. 15, and the pulsing of wire P14, and a new data bit has been entered into the address register in response to the energization of single shot 176 and the resultant pulsing of wire P15. Now, when single shot 176 goes off, it turns on a single shot 178, thereby pulsing wire P16, FIG. 15 and 14C. This conditions a gate 180 to pass a signal which appears on either wire 66 or wire 68, FIGS. 14C and 12, according to whether the setting of length counter 62 is or is not 000. If it is not, the converter 64, FIG. 12, puts a signal on the wire 68, and this passes through gate 180, FIG. 14C, to a wire 182, FIGS. 14C and 15, to energize single shot 184. This results in the pulsing of wire P17, FIGS. 15 and 14A, and this pulse then passes through OR circuit 100 and wire 102, FIGS. 14A and 12, to the device for decrementing the setting of the length counter 62 by 1.

As single shot 184 (FIG. 15) goes off, it applies a pulse through wire 186 and OR circuit 172 to the single shot 174, thereby re-initiating the sequence of steps P14 et seq. This sequence is repeated as many times as necessary to reduce the setting of the length counter 62 to 000. In the course of such action, the contents of the address register 10, FIG. 12, will have been shifted through L+1 bit positions, due to the fact that the first shift takes place before the first testing and decrementing of the length counter setting.

Ultimately the setting of the length counter 62, FIG. 12, becomes reduced to 000 as the decrementing operation (step P17) is performed a sufficient number of times. Following this, one more shifting step (P14) and ingating step (P15) are performed. Then, as single shot 178 goes on again to energize wire P16, FIGS. 15 and 14C, the gate 180 now becomes conditioned to pass the zero output signal from wire 66, FIGS. 12 and 14C. This zero signal then passes through a wire 188 and OR circuit 108, FIG. 15, to the single shot 110, turning this single shot on to pulse the wire P6. By referring to FIGS. 11 and 12, it can be seen that pulsing wire P6 initiates a new accessing of the primary processor memory 12. The leading portion of the new VL code by now has been shifted into the highest-order positions of the address register 10, and the system therefore is ready to start decoding this new VL code.

The subprogram which involves the steps P14 to P17, FIG. 11, may be summarized as follows:

| | |
|---|---|
| P14 | Shift contents of address register **10** one bit to left. |
| P15 | Ingate one bit into address register **10**. |
| P16 | Test setting of length counter **62**. If not 000, go to step **P17**. If 000, go to step **P6**. |
| P17 | Decrement length counter setting by 1. Go to step **P14**. |

Thus far in this detailed description we have considered only the case where the VL code length is eight bits or less. The decoding of such a VL code does not involve the secondary processor S, FIGS. 4–13.

There now will be considered a case in which the VL code length exceeds eight bits. The first eight bits of this VL code are stored in the address register 10, FIG. 12. This eight-bit leading portion of the VL code is treated initially by the primary processor P as though it constituted an entire eight-bit VL code. That is to say, the primary processor performs steps P6 through P9, FIG. 11, in the same manner as it would for any other VL code. In this instance, however, the C bit stored in flip-flop 112 is 1 rather than 0. The L value, instead of being 1 less than the code length, is now 1 less than the difference between the code length and eight bits, and this value is stored in the length counter 62. The item read from field AB and stored in the code register 114 is not, in this instance, a completely decoded ID code. Rather, it is a value which together with new data can be converted into a new address for locating the ID code in the secondary processor memory 26, FIGS. 4 and 13.

It will be recalled from the previous description that when step P9 is reached in the flowchart of FIG. 11, the wire P9, FIGS. 15 and 14B, is pulsed to condition gate 138 for passing either a 0 or 1 output from the C-bit flip-flop 112, FIG. 12. In the present instance, where the VL code length exceeds 8 bits, the C-bit is 1. Hence, the wire 142 leading from the 1 side of flip-flop 112 is energized, and the signal on this wire 142 now passes through gate 138, FIG. 14B, to a wire 190 which is connected through OR circuit 192, FIG. 15, to the input of single shot 194. This single shot now turns on to pulse the wire P18, FIGS. 15 and 14B, thereby conditioning a gate 196 to pass the 1 or 0 signal from flip-flop 152, described hereinabove. The setting of flip-flop 152 indicates the operational status of the secondary processor, the manner in which this is accomplished being explained hereinafter. If the secondary processor is still functioning from a previous decoding operation, flip-flop 152 has a 1 setting. Under these circumstances, the 1 signal is now passed through gate 196, FIG. 14B, to a wire 198 for turning on a single shot 200, FIG. 15. Output signal from single shot 200 appears on a wire P19, from whence it passes through the OR circuit 192 back to single shot 194, thereby maintaining the output wire P18 and single shot 194 energized so long as the status of flip-flop 152, FIG. 14B, remains in its 1 setting, i.e., so long as the secondary processor is still functioning from a previous decoding operation.

Assume now that the secondary processor S is in an idle state, with the setting of flip-flop 152 at 0. At the time that the wire P18 is energized, the gate 196, FIG. 14B, will pass the 0 output from flip-flop 152 through a wire 202, FIGS. 14B and 15, to single shot 204, which turns on to place a pulse on wire P20, FIGS. 15 and 14C. This conditions a gate 206, FIG. 14C, for transferring the contents of the code register 114 in the data register 20, FIG. 12, to address register 24 of the secondary processor S, FIGS. 13 and 14. Tracing this operation in detail, the 8 bits stored in code register 114, FIG. 12, are transferred in parallel through cables 163 and 70, FIGS. 12, 14A, 14B and 14C, thence passing through a cable 208, gate 206 and cables 210 and 212 to the cable 214, FIG. 13, which leads to the address register 24 in secondary processor S. As indicated previously this is a parallel-bit transfer in which all eight bits read from the code register 14, FIG. 12, are concurrently entered into the address register 24, FIG. 13.

Thus, the eight-bit code read out of the register 114 in response to the first 8 bits of the current VL code now becomes a base address for locating the final ID code in the secondary processor S. The decoding operation performed by the secondary processor commences when the single shot 204, FIG. 15, goes off, applying a pulse on wire P20', FIGS. 15 and 14B. As one consequence of pulsing wire P20', the status flip-flop 152 is set to its 1 condition for indicating that the secondary processor is now in operation. Wire P20' further extends through a cable 220, FIGS. 14B, 14C and 16, to an OR circuit 222 leading to a single shot 224 in the secondary pulse generator, FIG. 16. Hence the pulsing of wire P20' results in turning on the single shot 224 to apply a pulse on wire S1, which extends through cable 225, FIGS. 16 and 14C and thence through cable 212 to the shifting device for the address register 24, FIG. 13, in the secondary processor S. This begins a sequence of steps S1–S4, FIG. 11, for ingating the remaining L+1 bits of the current VL code to the address register 24, FIG. 13.

The contents of address register 24 are shifted 1 bit to the left in response to the pulsing of wire S1. Then, when single shot 224 in the secondary pulse generator, FIG. 16, goes off, the next single shot 228 goes on to pulse the wire S2, FIGS. 15 and 14C, which extends through cables 226 and 212 to the ingating means consisting of gate 230 and delay circuit 232 for the secondary processor S, FIG. 13. The activating of gate 230 permits the next code bit to pass from the input device to the lowest-order position of the address register 24. Through delay line 232 the input device then is pulsed so that the next VL code bit will be ready to enter the address register 24 when gate 230 next is activated.

Figure 16:
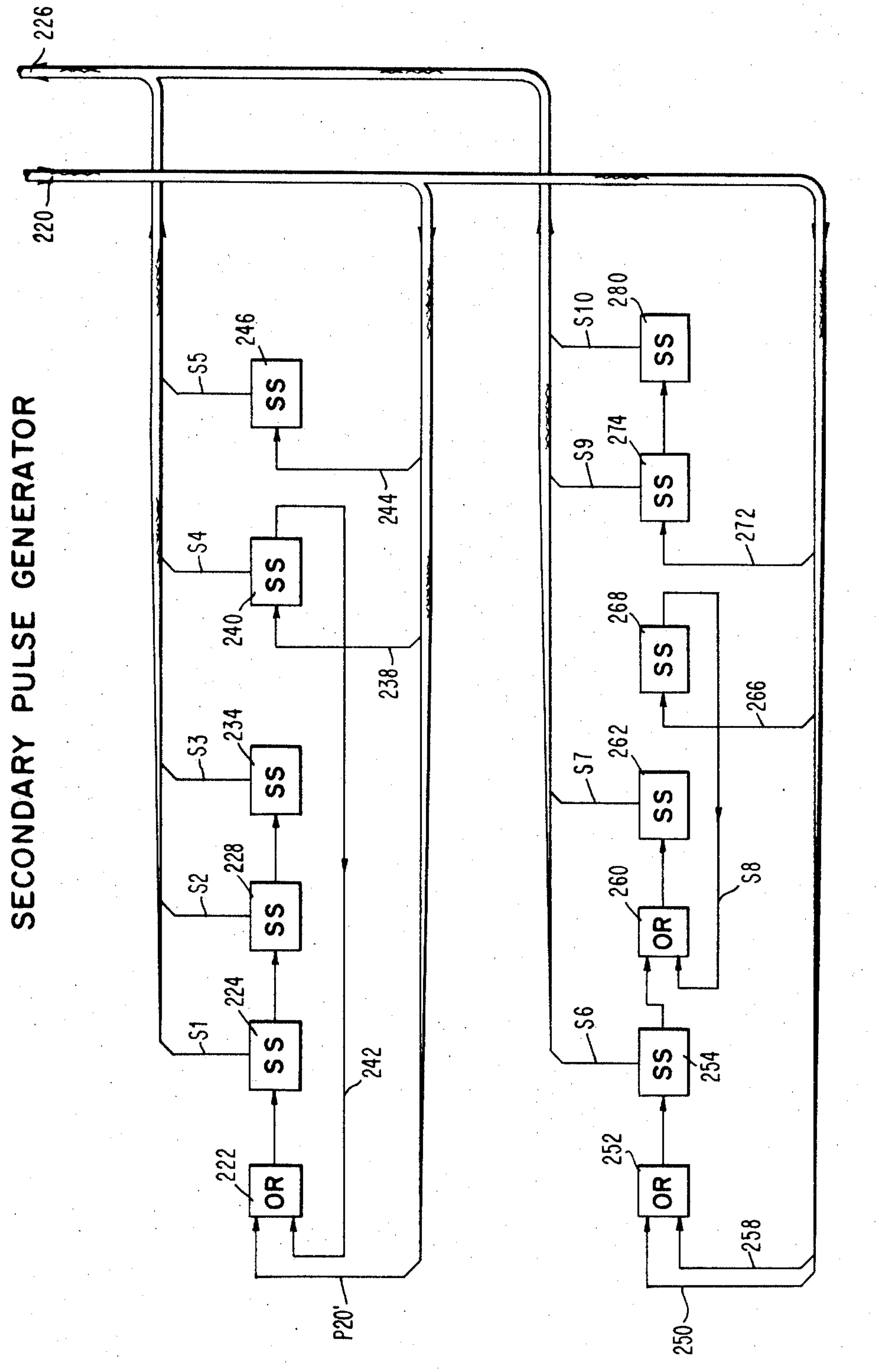

As single shot 228 goes off, FIG. 16, single shot 234 turns on to pulse the wire S3. This conditions a gate 236, FIG. 14C, to pass either a 0 or not-0 output from the converter 64, FIG. 12, which is associated with the length counter 62 in the data register 20 of the primary processor P. The number registered in the counter 62 is the current L value, which in the present instance is one less than the number of bits by which the current VL code exceeds the eight bits which already have been partially decoded. Assuming that the length counter 62 currently registers a value other than 0 (i.e., other than 000) the wire 68 is energized, and through gate 236, FIG. 14C, this energization is extended through wire 238, FIGS. 14C and 16, to single shot 240, which turns on to pulse wire S4, FIGS. 16 and 14A. The pulse on wire S4 passes through OR circuit 100 and wire 102, FIGS. 14A and 12, to the decrementing device in length counter 62, causing the setting of this counter to be reduced by 1.

When single shot 240, FIG. 16, goes off, it sends a pulse through wire 242 and OR circuit 222 back to the input side of single shot 224, which turns on to initiate a new sequence of steps S1 et seq. as just described. This sequence is repeated as many times as necessary to bring the remaining L+1 bits of the present VL code into the address register 24, FIG. 13, and to shift the contents of this register by the same amount to the left as these bits are entered. Ultimately, the address register 24 stores the remainder of the eight-bit code initially transferred thereto from the code register 114, FIG. 12 (after the leading L+1 bits thereof have been shifted out of the register 24), plus the L+1 bits which were left in the current VL input code after the first 8 bits thereof had been processed in the primary processor P. In effect, register 24 now stores the combination of a base address plus a displacement value, as explained hereinabove. The quantity now registered in the address register 24 is the address in memory 26 at which the final ID code will be found.

At this point in the operation the setting of the length counter 62, FIG. 12, will be reduced to 000. In this condition, when the wire S3, FIG. 16, is pulsed, the gate 236, FIG. 14C, is conditioned to pass the zero output signal from wire 66, FIGS. 12 and 14C, to a wire 244, FIGS. 14C and 16, leading to a single shot 246. As this single shot turns on, it pulses wire S5, FIGS. 16 and 14B to activate a gate 248 for testing the setting of the byte counter 50. This step is indicated at S5 in FIG. 11. Assuming that the byte counter setting has not been reduced to 0, a not-zero output from converter 116 now passes through gate 248 and wire 250, FIGS. 14B and 15, to the OR circuit 54 leading to the input side of single shot 56 in the primary pulse generator. The same wire 250 also is connected through an OR circuit 252, FIG. 16, to the input side of a single shot 254 in the secondary pulse generator, FIG. 16. On the flowchart, FIG. 11, this action is indicated by the flow lines extending from the "NO" output of step S5 to the inputs of steps P1 and S6. The reason for this two-fold action is as follows:

As explained hereinabove, operating time can be saved if, while the secondary processor S still is in operation, the primary processor can start decoding the next VL code in the incoming bit stream. After the remaining L+1 bits of the current VL code have been ingated to the secondary processor (steps S1–S4, FIG. 11), the primary processor may receive the next 8 VL code bits in the bit stream, and its action will not interfere with the remaining operation of the secondary processor. In this way there is achieved a partial overlap in the respective operations of the primary and secondary processors thereby effecting a considerable economy in operating time.

Figure 13:
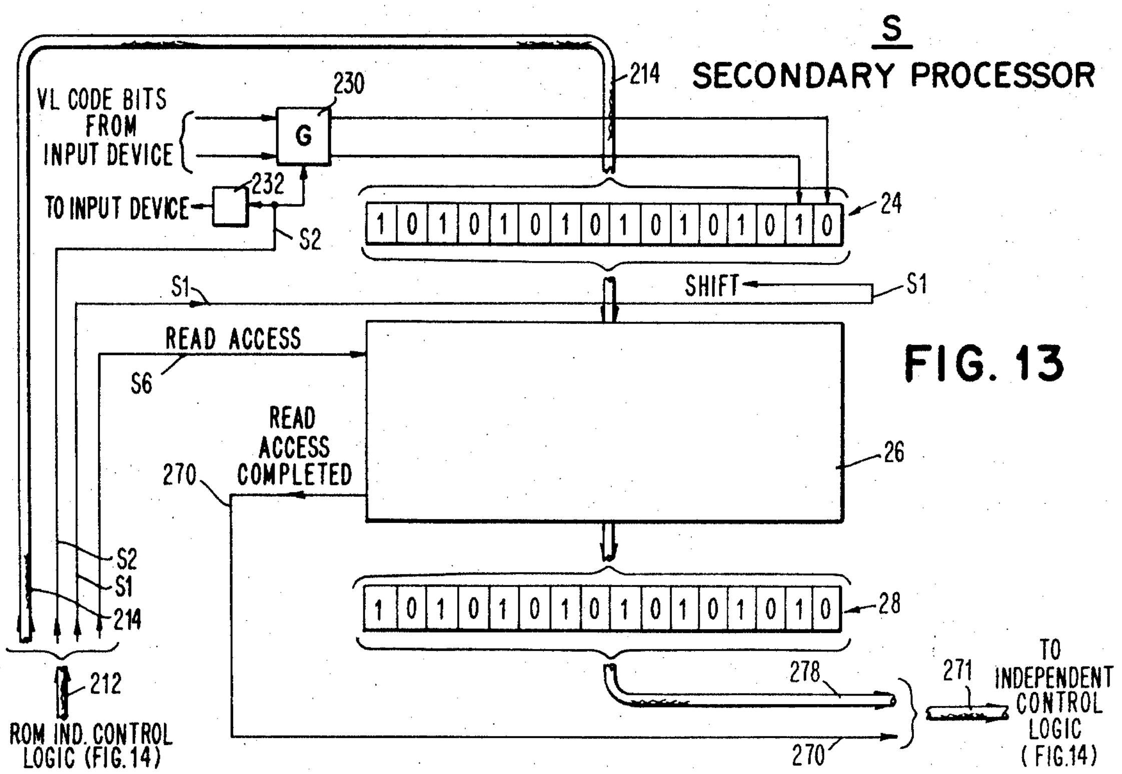

Referring again to FIG. 16, when single shot 254 turns on, a pulse is extended through wire S6 to the read access means associated with the memory 26, FIG. 13, of the secondary processor S. This commences the accessing of the secondary processor memory to locate the ID code specified by the address now standing in register 24. In order to indicate to the rest of the system that such accessing operation is in progress, a flip-flop 256, FIG. 14C, is set to its 1 state in response to the pulse on wire S6.

It was assumed hereinabove that the setting of the byte counter 50, FIG. 14B, was other than 000 when it was tested in step S5, FIG. 11. If the byte counter setting had been 0 (indicating that the last of the input VL codes is now in process of being decoded), the operation just described would have been the same except that no restart signal would have been sent back to the primary processor. Thus, referring to FIG. 14B, activation of the gate 248 under these circumstances would have passed a 0 signal from decoder 116 through a wire 258 to the OR circuit 252, FIG. 16, associated with the single shot 254. Hence, the effect upon single shot 254 is identical whether the wire 250 or the wire 258 is energized. By not energizing wire 250, however, the primary pulse generator, FIG. 15, is prevented from operating, so that the primary processor remains idle in this condition.

As the secondary processor memory 26, FIG. 13, is accessed (step S6, FIG. 11) the ID code corresponding to the address stored in register 24 is read out to a data register 28 in the secondary processor S. At this time as mentioned above, the status of flip-flop 256, FIG. 14C, is set to a 1. When single shot 254 goes off, FIG. 16, it sends a pulse through OR circuit 260 for turning on the single shot 262. This pulses the wire S7, FIGS. 16 and 14C, to activate the gate 264 associated with the output of flip-flop 256. While the memory 26, FIG. 13, is in its read access state, flip-flop 256 will furnish a 1 output signal that passes through gate 264 and wire 266, FIGS. 14C and 16, to a single shot 268. As this single shot goes on it sends a pulse through wire S8 and OR circuit 260 back to the input of single shot 262. Thus wire S7 continues to be pulsed as long as the read access operation is in progress.

Upon completion of the read access operation, a pulse is sent through wire 270, FIGS. 13 and 14C, to the flip-flop 256 for resetting the latter to its 0 state. The 0 output signal from flip-flop 256 now passes through gate 264 and wire 272 to single shot 274, FIG. 16, which turns on to pulse the wire S9. The pulsing of wire S9, FIGS. 16 and 14C, activates a gate 276 for transferring the contents of data register 28, FIGS. 13 and 4, to the output device, as indicated in the flowchart of FIG. 11. Specifically, the ID code now stored in data register 28, FIG. 13, passes through cables 278 and 271, FIGS. 13–14C, thence through gate 276 to a cable 278 leading to the output device as the final decoded output.

As the single shot 274, FIG. 16, goes off, it turns on the single shot 280 for pulsing wire S10, FIGS. 16 and 14B. This has the effect of resetting the status flip-flop 152 to its 0 state, thereby indicating that the operation of the secondary processor S is ended. This information is needed at various points in the operation of the primary processor (i.e., at steps P10 and P18, FIG. 11) during the subsequent decoding operation, if any. The pulsing of wire S10, as above described, also supplies one of the inputs to a two-input AND circuit 284, FIG. 14B. The other input to this AND circuit 284 is supplied by the decoder 116 when the setting of byte counter 50 is reduced to 0, indicating that there are no more VL codes to be decoded. When these conditions prevail, an "End of Program" signal is furnished at the output side of the AND circuit 284. If, however, the byte counter setting has not yet been reduced to 0, the application of an S10 signal pulse to the AND circuit 284 is without effect.

The operation of the secondary processor in the current decoding operation now is completed. Meanwhile, if there are additional VL codes, the decoding of the next succeeding VL code will be taking place within the primary processor. Whenever the secondary processor S is used in a decoding operation, the next decoding operation commences with the ingating of eight new VL code bits into the primary processor P (steps P1–P5, FIG. 11). This is because all eight bits initially stored in the P address register 10, FIG. 12, were utilized in forming a new address to locate the output ID code in the secondary processor S, and no new VL code bits can be supplied to processor P until its operation is restored after step S5 (FIG. 11) in the secondary processor operation. When the operation of processor S is not involved, however, the primary processor P may recycle itself through steps P6 to P17, FIG. 11, omitting steps P1 to P5. If the final VL code in the series is less than nine bits in length, the "End of Program" signal is generated in step P13; otherwise it is generated in step S10.

DEPENDENT DECODING (FIGS. 17–21C)

Figure 17:
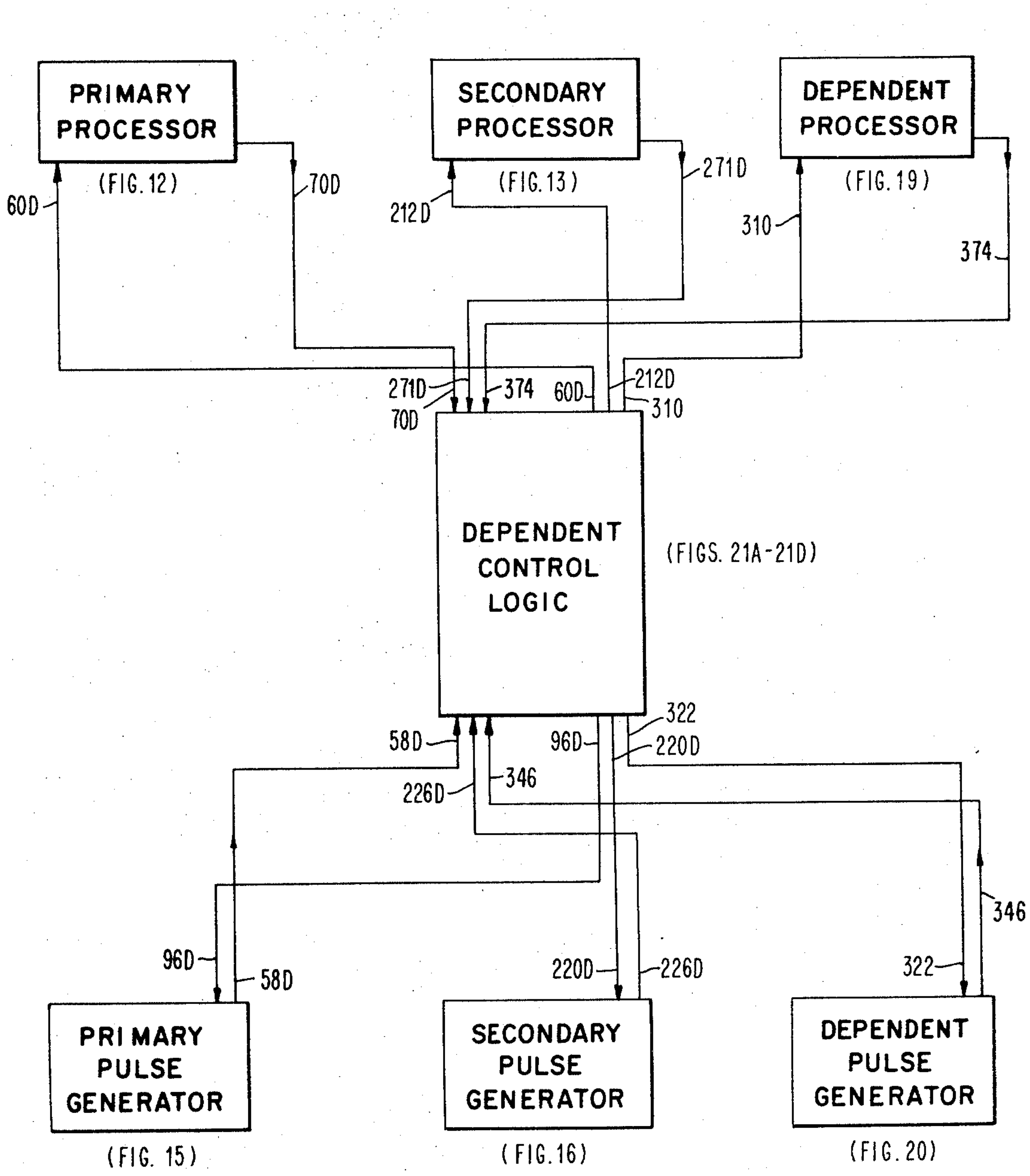
FIG. 17 is a general block diagram of the dependent decoder as a whole, indicating its various components.
Figures 19, 20:
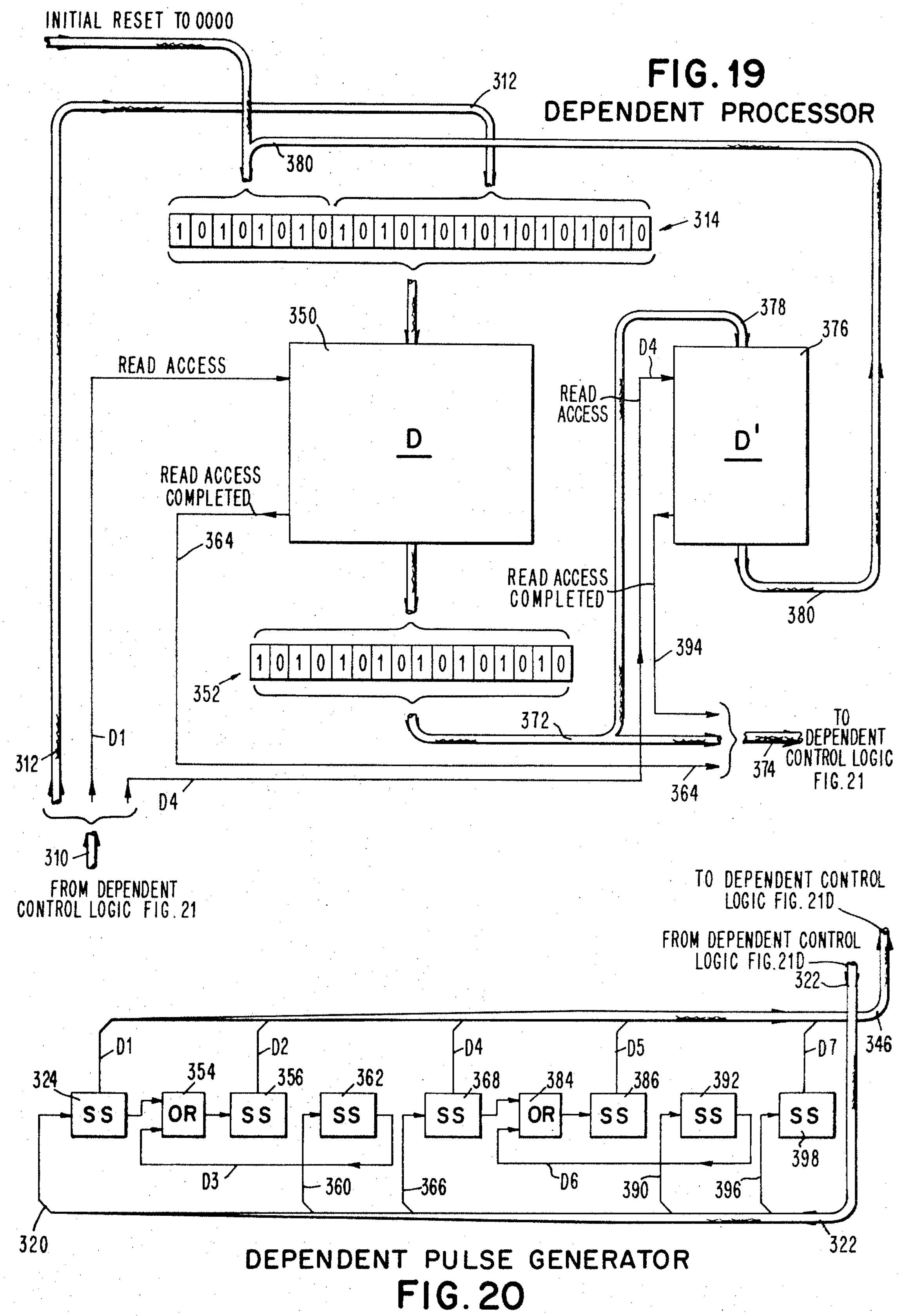
FIGS. 19–21D are detailed circuit diagrams showing portions of the dependent decoder for carrying out the decoding process shown in FIG. 18.

FIG. 17 is a block diagram showing the components utilized in a dependent decoding scheme according to the invention. This scheme uses the following components of the independent decoding scheme previously described: primary processor (FIG. 12), secondary processor (FIG. 13), primary pulse generator (FIG. 15) and secondary pulse generator (FIG. 16). In addition, the dependent decoder employs a dependent processor (FIG. 19) and a dependent pulse generator (FIG. 20). A control logic unit, FIGS. 21A–21D, which is an expanded version of the control logic unit shown in FIGS. 14A–14C, is employed in the dependent processor to control the operations of the various units mentioned above.

In the dependent mode, an operation of the dependent processor follows an operation of the secondary processor in those instances when the latter is used, and in those instances when the primary processor alone is used, its operation is followed immediately by an operation of the dependent processor.

Figure 18:
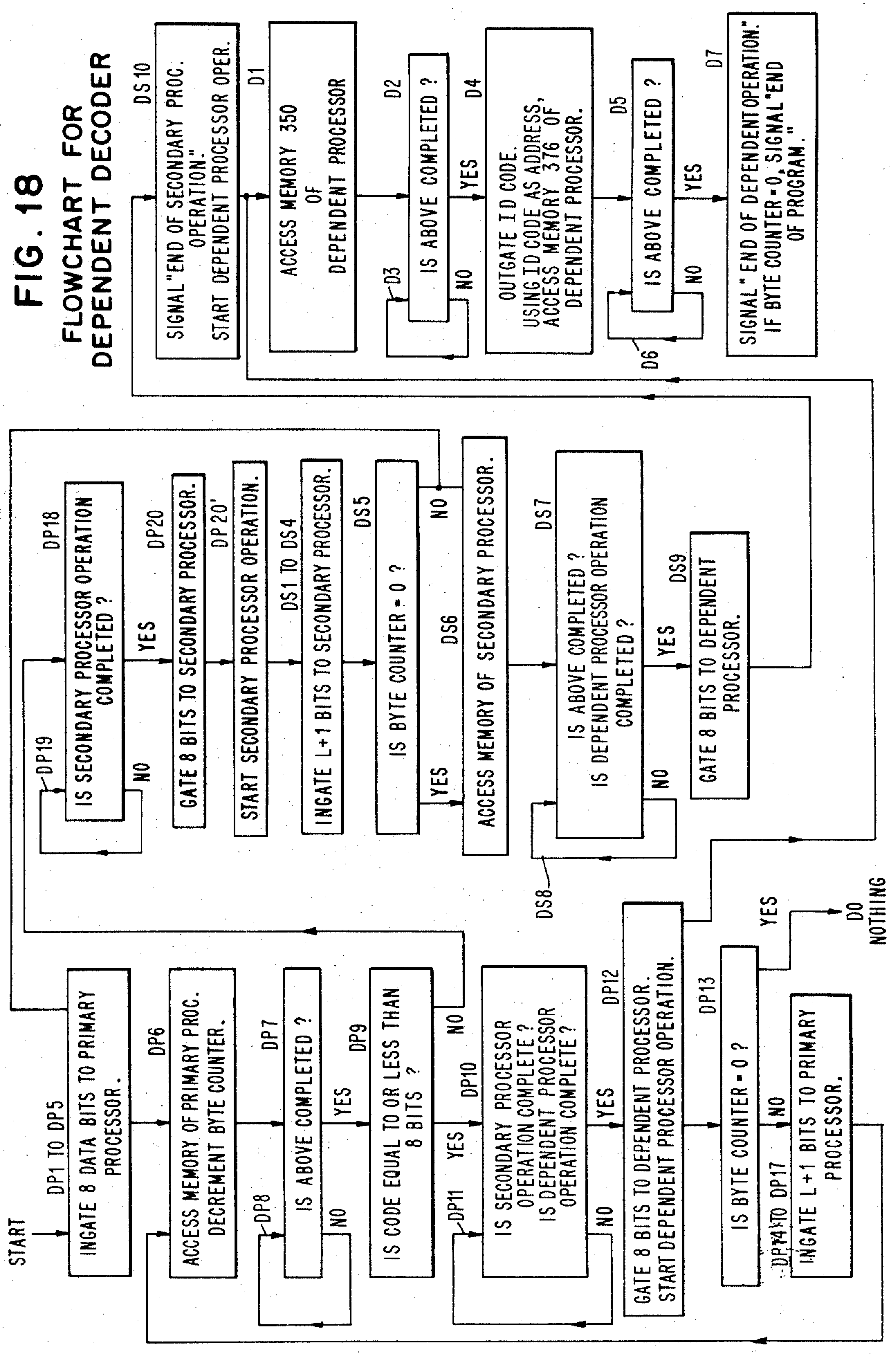
FIG. 18 is a flowchart of the dependent decoding process which is carried out by the exemplary embodiment shown in FIGS. 19–21D in conjunction with the apparatus shown in FIGS. 12, 13, 15 and 16.

FIG. 18 shows the flowchart of the dependent decoding process. The operation of the dependent processor (FIG. 19) is designated by steps D1 through D7 at the right-hand side of FIG. 18. Those flowchart steps whose designations have DP or DS prefixes relate to the operations of the primary and secondary processors (FIGS. 12 and 13) in the dependent decoding scheme. No structural changes are required in the primary and secondary processors or in their respective pulse generators to adapt these units for use in the dependent decoding scheme. Whatever differences may exist between the DP or DS steps in the flowchart of FIG. 18 and the similarly numbered steps bearing P or S prefixes in the independent decoding flowchart of FIG. 11 are due entirely to the controls exercised by the logic control circuitry shown in FIGS. 21A–21D, as will become apparent from the description that follows.

Inasmuch as the dependent encoding and decoding principle has been explained hereinabove in conjunction with FIGS. 5–9, an understanding of this principle will be assumed in the present detailed description. It will be assumed also that the basic operations of the primary and secondary processors are well understood from the preceding description of the independent decoding process. Attention will be given herein primarily to those features of the dependent decoding process which differ from or are added to the features of the independent decoding process described above. In all other instances, reference should be had to the description associated with FIGS. 10–16 in order to correlate identical functions of the two systems.

To aid in correlating the elements of the independent control logic, FIGS. 14A–14C, with the corresponding elements of the dependent control logic, FIGS. 21A–21D, such elements are identified by similar reference numbers in the two logic diagrams. In some instances a suffix D is added to each of the corresponding reference numbers in FIGS. 21A–21D. For example, cable 70D, FIG. 21A, corresponds to cable 70 shown in FIGS. 12 and 14A–14C. In other instances, as explained hereinabove, a prefix D is employed in conjunction with some of the reference characters used in FIGS. 18–21D. Wherever an element that has no counterpart in the independent decoding system (FIGS. 12–16) is shown in the detailed drawings of the dependent decoding system (FIGS. 19–21D), it is identified by a reference number higher than 299.

Referring now to FIG. 18, which shows the flowchart for the dependent decoding process, operation commences with steps DP1–DP5, wherein the first eight data bits are gated into the address register for the primary processor. This phase of the operation is identical with steps P1–P5 of FIG. 11, which were described hereinabove in connection with the independent decoding process. Similarly, steps DP6–DP9, FIG. 18, are identical with steps P6–P9 in FIG. 11 and will not be described in detail herein.

At step DP9 a decision is made whether or not the operation of the secondary processor will be involved, according to whether the current VL input code does or does not exceed eight bits in length. Assuming for the present that the VL code length does not exceed eight bits, the operation now proceeds to step DP10, FIG. 18. At this point, it is necessary to determine whether the secondary processor or the dependent processor is still operating from a previous decoding process. To this end, the circuitry is arranged so that the timing pulse on the wire DP10, FIG. 21C, activates a gate 300 in order to test the condition of flip-flops 152D and 302. The flip-flop 152D (like the flip-flop 152, FIG. 14B) is set to its 1 state while the secondary processor is operating and restored to its 0 state when operation of the secondary processor terminates. Similarly, flip-flop 302 is set to 1 while the dependent processor is operating and is restored to 0 when such operation is concluded. If either of the flip-flops 152D and 302 is in its 1 state, output of this flip-flop passes through OR circuit 304 and through the gate 300 to a wire 158D which performs the same function as the wire 158, FIGS. 14B and 15; which is to say, that it causes the loop consisting of steps DP11 and DP10, FIG. 18, to be executed so long as either the secondary processor or the dependent processor is in operation.

Figures 21, 21A:
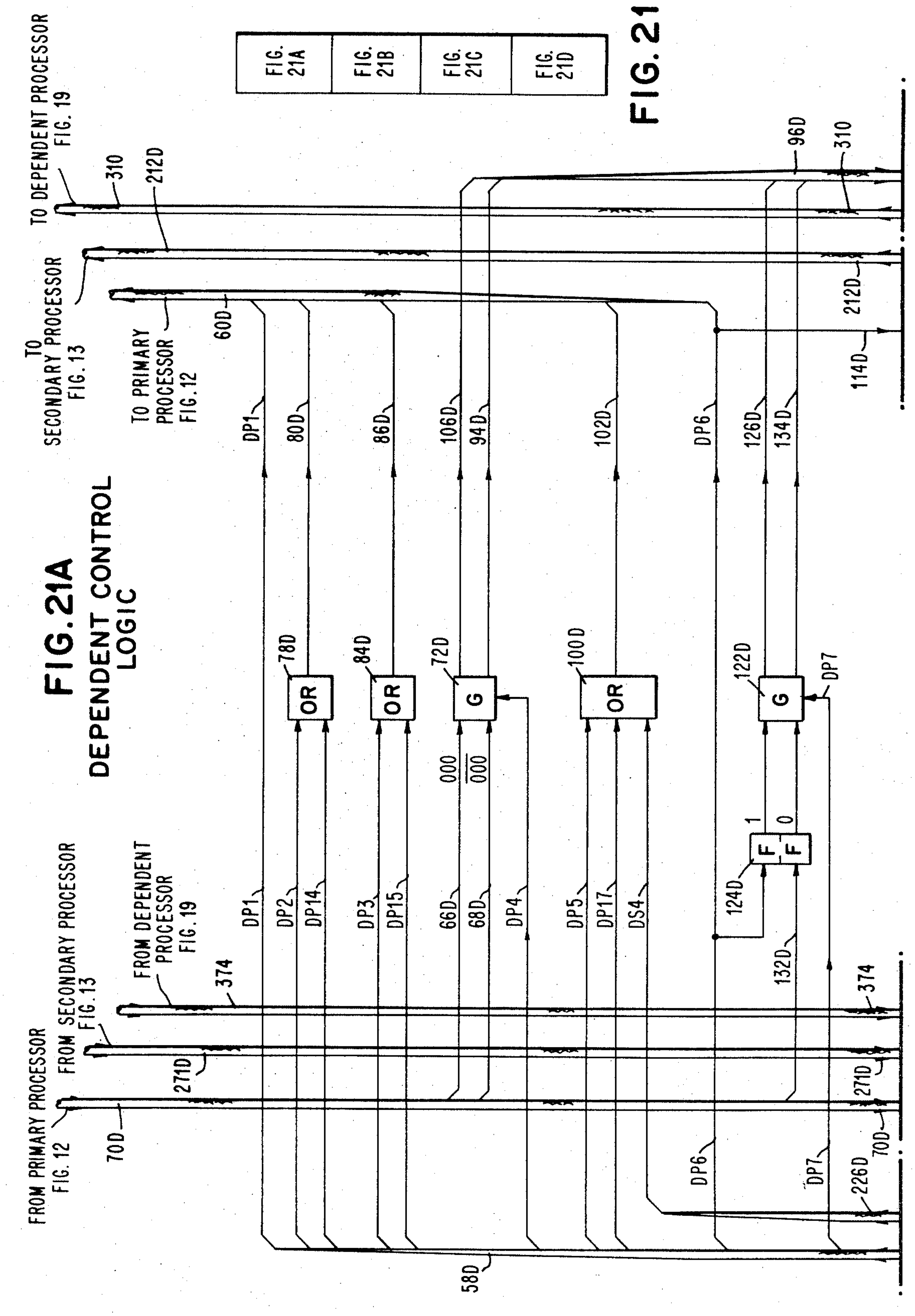
Figure 21B:
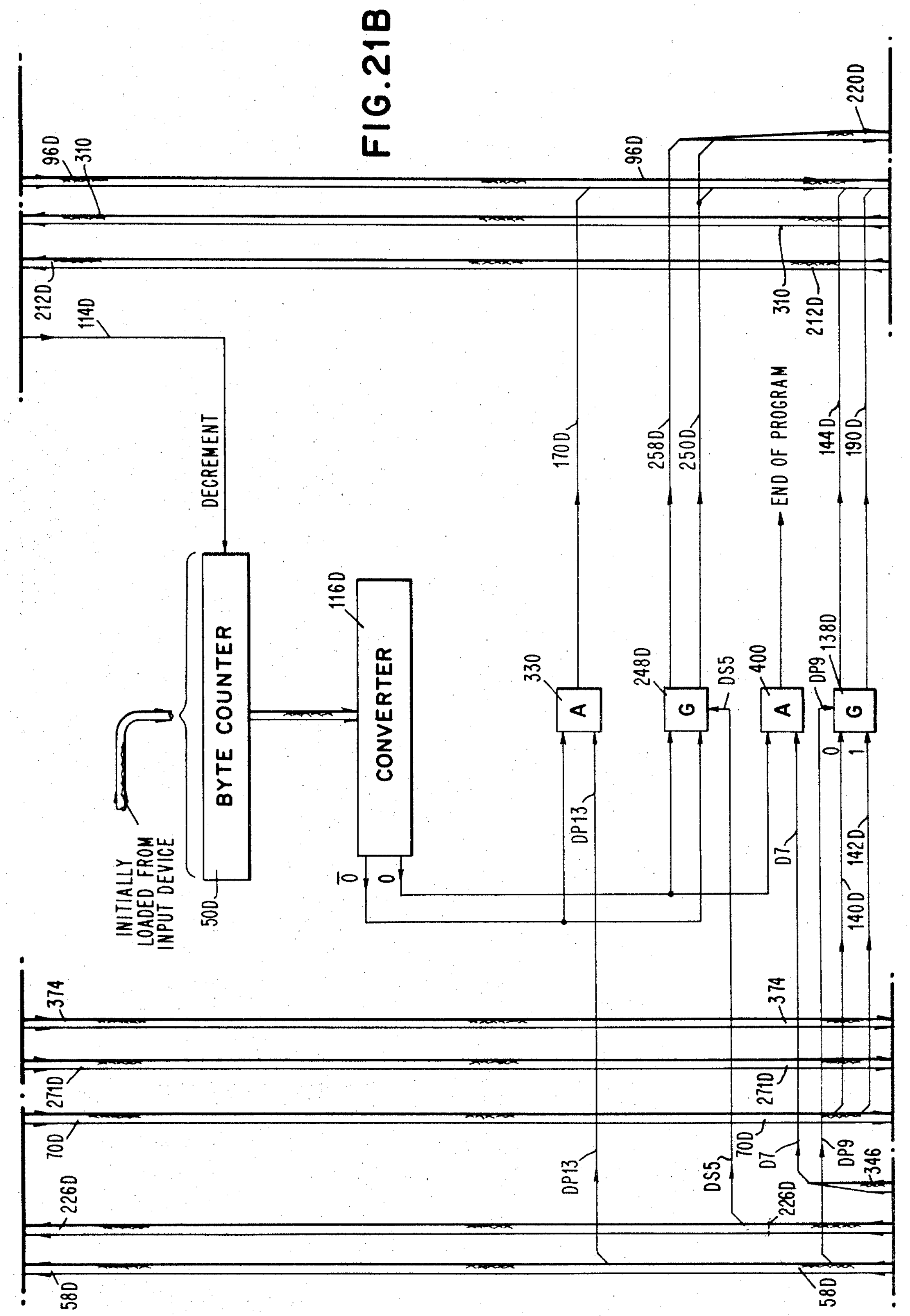
Figure 21C:
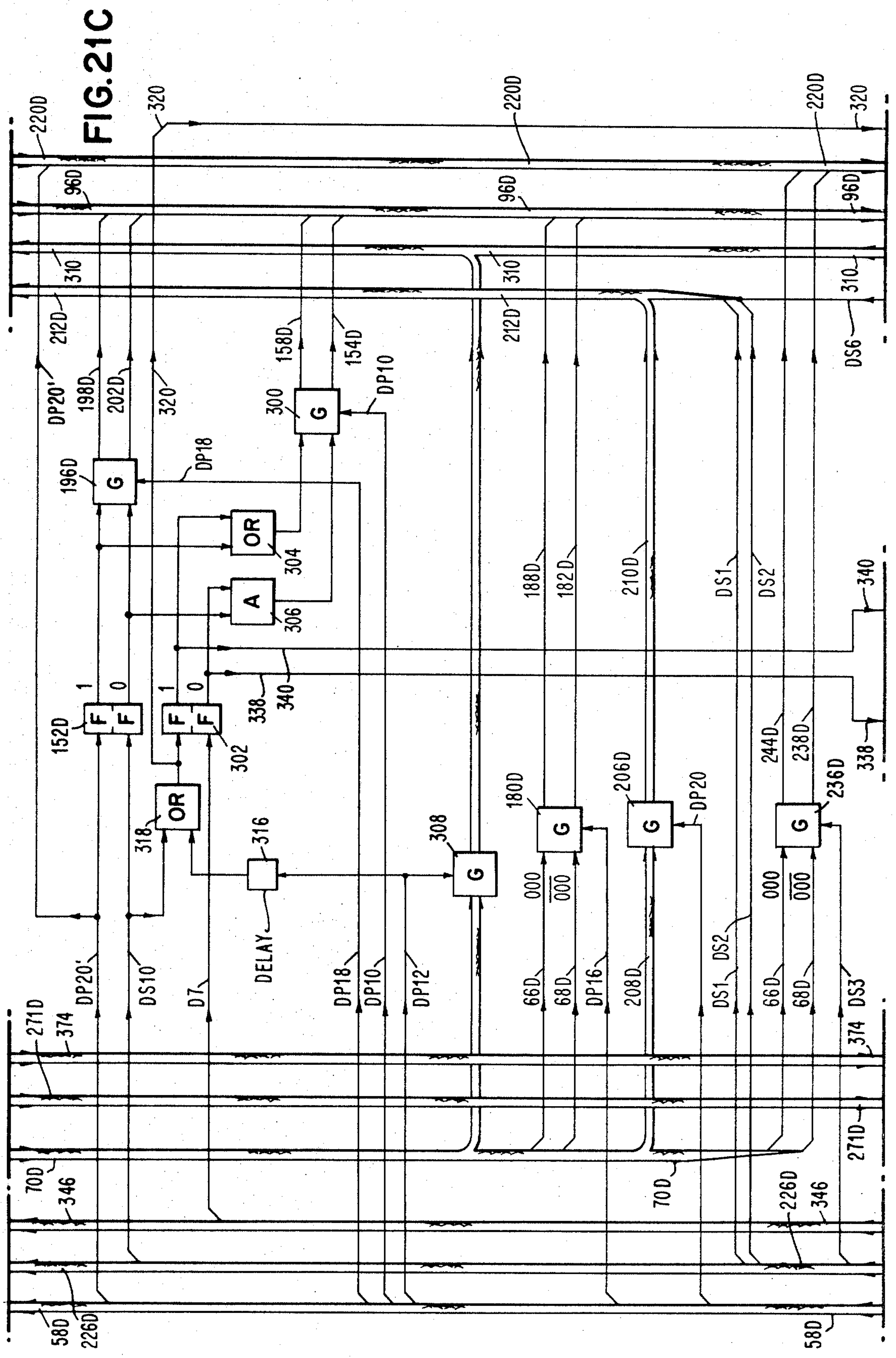

Assuming that the secondary and dependent processors are not operating, the activation of gate 300, FIG. 21C, by the DP10 pulse causes a 0 output from the flip-flop 152D and 302 to pass through AND circuit 306 and gate 300 to the wire 154D which corresponds to the wire 154 shown in FIGS. 14B and 15. This advances the operation from step DP10, FIG. 18, to step DP12. If this were an independent decoding process, the output ID code now would be made available. Inasmuch as this is a dependent decoding process, the eight-bit intermediate ID code generated by the primary processor now must be gated into the address register of the dependent processor for use in forming a new address therein at which the final output ID code will be found.

The timing pulse on wire DP12, FIG. 21C, activates a gate 308 which causes the intermediate ID code generated by the primary processor to pass from the output cable 70D of the primary processor into the input cable 310 leading to the dependent processor shown in FIG. 19. From thence this intermediate ID code passes through a cable 312, FIG. 19, and enters the 8 lowest bit positions of the 12-bit address register 314 in the dependent processor. The four highest bit positions of the address register 314 are assumed to be initially reset to 0000 by suitable means (not shown). Concurrently with effecting this entry into the address register 314, the timing pulse on wire DP12, FIG. 21C, is applied through a delay device 316 and an OR circuit 318 to the input of the status flip-flop 302 for setting this flip-flop to its 1 state, thereby indicating that the dependent processor is in operation. This delayed pulse also is extended through a wire 320, FIG. 21C, and cable 322, FIGS. 21D and 20, to a single shot 324 in the dependent pulse generator, thereby initiating the operation of the dependent processor. The detailed operation of the dependent processor will be explained presently.

With the completion of step DP12, FIG. 18, the primary processor is now free to commence processing the next VL code. As a preliminary to such operation, steps DP13–DP17 are performed. At step DP13, the setting of the byte counter 50D, FIG. 21B, is tested. If the byte counter setting is not zero, indicating that there are more input VL codes to be decoded, the concurrence of the not-zero output from the decoder 116D and the timing pulse on wire DP13 at the AND circuit 330, FIG. 21B, applies a pulse on wire 170D, which performs a function like that of wire 170, FIG. 15. That is to say, the energization of wire 170D, FIG. 21B, initiates the sequence of steps DP14–DP17, FIG. 18. In the course of this action, L+1 new bits of data are gated into the address register of the primary processor, and the contents of this address register are shifted by a corresponding amount to bring the next VL code into position for decoding in the primary processor.

If the byte counter setting had been reduced to 0, the energization of wire DP13, FIG. 21B, would have been without effect. Under this condition, there would be no further VL codes to be decoded, thereby requiring no new operation of the primary processor. However, no "End of Program" signal will be generated until the operation of the dependent processor has been completed.

In the foregoing description it was assumed that the VL code length did not exceed eight bits, so that the primary processor executed the steps DP10 through DP17, FIG. 18, thereby causing the ID code read out from the primary processor to become the input code to the dependent processor (step DP12). If the VL code length had exceeded eight bits, however, the operation would have branched from step DP9 to step DP18. From this point on the operation is the same as it would be for an independent decoding operation, through the step DS6, FIG. 18.

Figure 21D:
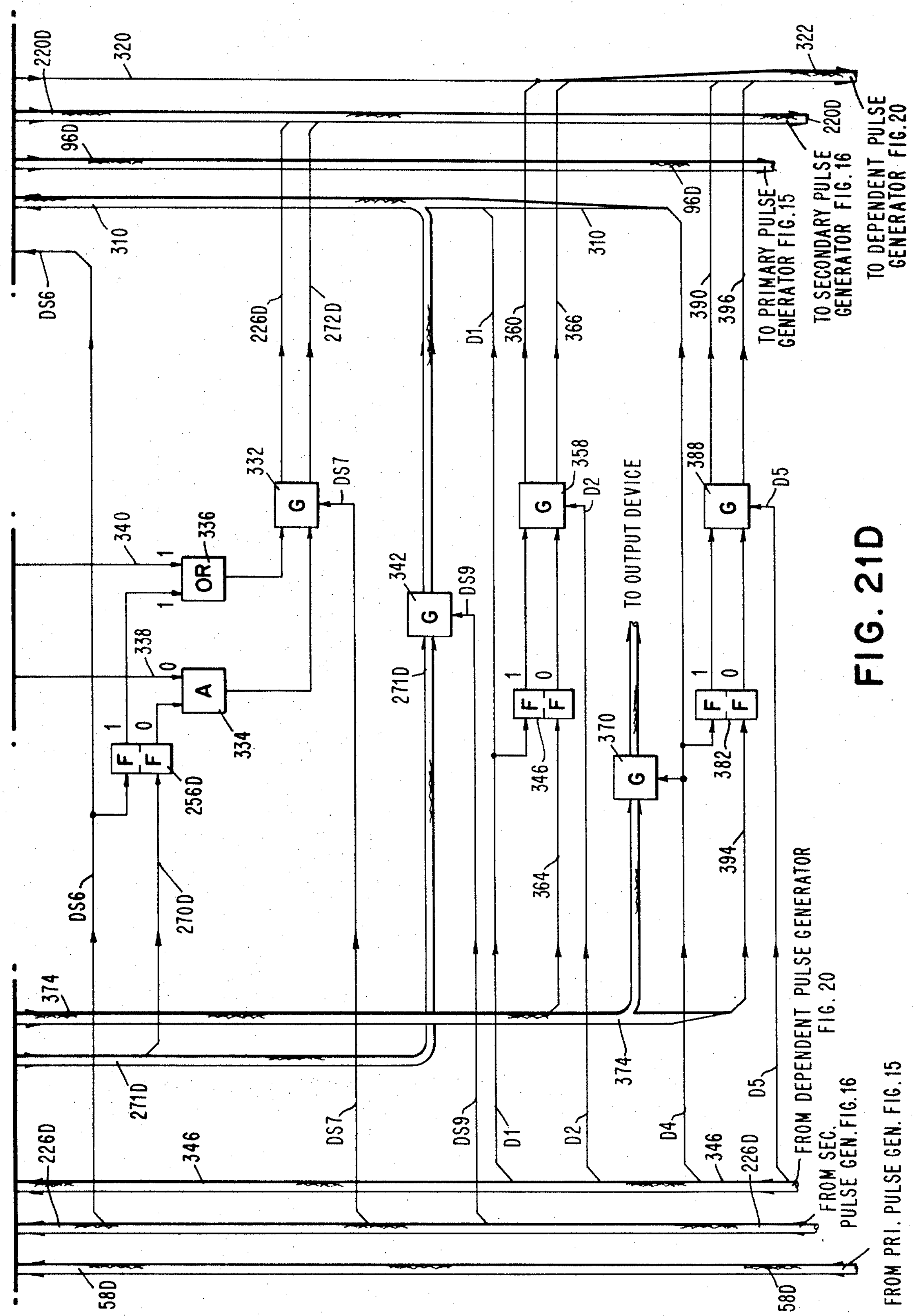

At step DS7, in addition to checking whether the read access operation of the secondary processor memory is completed, the operational state of the dependent processor also is checked. To this end, the timing pulse on wire DS7, FIG. 21D, is applied to a gate 332, which receives inputs from an AND circuit 334 and an OR circuit 336. The AND circuit 334 receives inputs from the 0 side of the status flip-flop 256D for the secondary processor memory and (through wire 338) from the 0 side of the status flip-flop 302, FIG. 21C, for the dependent processor. The OR circuit 336, FIG. 21D, receives inputs from the 1 side of flip-flop 256D and (through wire 340) from the 1 side of flip-flop 302, FIG. 21C. If either of these flip-flops is set to 1, indicating that the secondary processor memory is still being accessed or that the dependent processor is still operating, the gate 332 passes a signal to wire 266D, FIG. 21D, which has the same effect as energizing wire 226 in FIGS. 14C and 16. That is to say, it causes the loop consisting of steps DS7 and DS8, FIG. 18, to be executed as long as this condition exists.

When both the flip-flops 302 and 256D, FIGS. 21C and 21D, have been reset to 0, the gate 332 passes a signal to wire 272D, which has the same effect as energizing wire 272 in FIGS. 14C and 16. That is to say, it advances the operation to the next step DS9, FIG. 18. This step however, differs from step S9 in FIG. 11. Instead of merely gating the eight-bit ID code out of the secondary processor as the final output code, the pulsing of wire DS9, FIG. 21D, activates a gate 342 which causes this ID code to pass from the output cable 271D of the secondary processor to the input cable 310 of the dependent processor, FIG. 19. From thence, the eight bits of the ID code pass through cable 312 into the eight lowest bit positions of address register 314 in the dependent processor.

Steps DS10, FIG. 18, in addition to signaling the end of the secondary processor operation, initiates the operation of the dependent processor. Referring to FIG. 21C, the timing pulse on wire DS10 passes through OR circuit 318 to flip-flop 302 (setting it to 0 for signaling the end of the secondary processor operation) and also to wire 320 which, as explained above, leads to the first single shot 324, FIG. 20, in the dependent pulse generator. This starts the operation of the dependent processor, as it is depicted in steps D1 through D6 of the flowchart, FIG. 18.

As the single shot 324, FIG. 20, operates, it pulses the wire D1 in cable 346, FIGS. 20 and 21D. This sets the status flip-flop 346 for the dependent processor to its 1 state, indicating that this processor is in operation. The pulse on wire D1 also extends through cable 310, FIGS. 21D and 19, to the read access circuitry for the memory 350 of the dependent processor, which stores the table D (See FIGS. 8 and 9). In the course of this read access operation the ID code which is stored at the address in memory 350 indicated by the setting of address register 314 will be read out to the data register 352 associated with the dependent processor.

When single shot 324 goes off, FIG. 20, it sends a signal through OR circuit 354 to turn on the single shot 356. This applies a pulse on wire D2, FIGS. 20 and 21D, to activate a gate 358 for testing whether the read access operation is completed. If the status flip-flop 346 is still set to 1, indicating that the read access is not completed, a signal is passed from the 1 side of flip-flop 346 through gate 358 to the wire 360, FIGS. 21B and 20. This turns on the single shot 362, which pulses the wire D3 and thereby extends energization back through the OR circuit 354 to single shot 356. Thus, the loop consisting of steps D2 and D3, FIG. 18, is executed until the read access operation is completed.

At the termination of the read access operation in the dependent processor, a completion signal is sent by memory 350, FIG. 19, through a wire 364, FIGS. 19 and 21D, to the flip-flop 346 for resetting this flip-flop to its 0 state. This causes a signal to pass from flip-flop 346 through gate 358 to a wire 366, FIGS. 21D and 20, thereby turning on single shot 368 to initiate step D4, FIG. 18.

The pulsing of wire D4, FIGS. 20 and 21D has several effects. First, it conditions a gate 370, FIG. 21D, to pass the output ID code from the data register 352 of the dependent processor, FIG. 19, through cables 372 and 374, FIGS. 19 and 21A–21D, to the output device. This is the final decoded output of the dependent processor. The second consequence of pulsing wire D4, FIGS. 20, 21D and 19, is to initiate a read access of a memory 376 which stores the table D' in the dependent processor, FIG. 19. At the same time that the ID code is read out from the data register 352 to the output device, this same code is also applied through cables 372 and 378, FIG. 19 as an address to the memory 376. At the location in memory 376 designated by this address, a four-bit code is read out and is fed through a cable 380 to the four highest-order positions of the address register 314 associated with the memory 350. This four-bit code will form part of the new 12-bit address that is applied to the memory 350 during the next decoding operation. It will be recalled that in a dependent decoding operation the final ID output code is read from a location in memory 350 that is determined in part by an intermediate ID code corresponding to the current VL code and in part by the final ID code that resulted from decoding the preceding VL code. This was explained hereinabove in the description associated with FIG. 8.

As a third consequence of pulsing the wire D4, FIG. 21D, a status flip-flop 382 is set to its 1 state to indicate that the memory 376, FIG. 19, is being read accessed. When the single shot 368, FIG. 20, goes off it sends a pulse through OR circuit 384 to turn on single shot 386, which pulses wire D5, FIGS. 20 and 21D. This activates a gate 388 for testing the output of the status flip-flop 382. If the output of this flip-flop is 1, a signal is passed by gate 388 to wire 390, FIGS. 21D and 20, turning on single shot 392. This applies a pulse through wire D6 and OR circuit 384 to single shot 386, which pulses the D5 wire. Thus, the loop consisting of steps D5 and D6, FIG. 18, is executed so long as the memory 376, FIG. 19, is being accessed.

When the accessed information has been completely read out of memory 376, a read access completion signal is transmitted over wire 394, FIGS. 19 and 21D, to flip-flop 382 for resetting the same to its 0 state. This now causes a signal to be passed through gate 388 and wire 396, FIGS. 21D and 20, to single shot 398, which turns on to pulse the wire D7.

The pulsing of wire D7 as just described has two effects. First, it causes the status flip-flop 302, FIG. 21C, to resume its 0 state, thereby signalling the end of the dependent processor operation. Such information is needed at certain steps of the succeeding operations (i.e., at steps DP10 and DS7, FIG. 18).

The second consequence of pulsing the wire D7, FIGS. 20 and 21B, is to test the setting of the byte counter 50D. If the byte counter setting has been reduced to 0, indicating that there are no more VL codes left to be decoded, the concurrence of the 0 output from decoder 116D and the D7 pulse causes an AND circuit 400, FIG. 21B, to pass an "End of Program" signal. If the byte counter setting has not yet reduced to 0, no such signal is emitted. The next succeeding operation of the independent processor will have been initiated by this time, since the operations of the independent and dependent decoders are overlapped.

While the invention has been particularly shown and described with reference to several exemplary embodiments thereof, it will be understood by those skilled in the art that various changes in form and details may be made therein without departing from the spirit and scope of the invention.

We claim:

1. A code conversion method whereby data encoded as bit strings of variable length can be utilized in a data processing system having memory units and registers which are adapted to handle data encoded as bit strings of fixed length, said method comprising the steps of:

a. serially entering the leading bits of an input bit stream containing successive variable-length codes into a first one of said registers until the number of such entered bits equals a fixed number:

b. storing in a memory unit, at each of the addresses therein specified by the various combinations of bits that may be entered into said first register, the following interrelated items of information:

b1. a fixed-length code corresponding to the first variable-length code or portion of such code which is defined upon entry of the respective bit combination denoting that address into said first register, and b2. associated information which is related to the number of bits in said variable-length code;

c. reading out of said memory unit to a second register, for use in a subsequent portion of said data processing system, the fixed-length code (b1) which is addressed by the bit combination currently stored in said first register, along with its associated information (b2);

d. shifting the contents of said first register serially through a number of bit positions determined by said associated information; and e. repeating steps (c) and (d) as needed for enabling the information represented by the succeeding variable-length codes in said bit stream to be processed by said system.

2. A method as set forth in claim 1 wherein said associated information (b2) is related to the number of significant bits contained in each variable-length code whose length does not exceed said fixed number, and step d involves shifting the contents of said first register by the corresponding number of bit positions.

3. A method as set forth in claim 2 wherein the fixed-length code entered into said second register in step (c) constitutes the decoded equivalent of the variable-length code specified in step b1.

4. A method as set forth in claim 1 wherein said associated information (b2) indicates whether the respective variable-length code is or is not longer than said fixed number, and step (d) involves shifting the contents of said first register by said fixed number of bit positions in each case where the respective variable-length code is longer than said fixed number.

5. A method as set forth in claim 4 wherein the fixed-length code entered into said second register in step (c) thereafter is entered into a third register to form at least a portion of an address for locating within a second memory unit the decoded equivalent of the variable-length code specified in step (b1).

6. A method of processing data in the form of variable-length bit strings by using data processing instrumentalities such as memory units and registers which can handle data in the form of fixed-length bit strings, said method comprising the steps of:

a. causing encodable items of information to be represented respectively by variable-length codes of such nature that the first N bits of any code which exceeds N bits in length is unique to that particular code length, thereby constituting an N-bit length prefix for that code;

b. serially entering the first N bits of an input bit stream containing such variable-length codes into a first address register associated with a first memory unit;

c. storing in said first memory unit, at each address therein specified by the various N-bit length prefixes that may be stored in said first register, information including a fixed-length code which represents a significant portion of a respective one of several base addresses in a second memory unit, as determined by the respective length prefix stored in said first address register;

d. storing in said second memory unit, at addresses therein which are determined in part by said base addresses and in part by the remaining bits of the respective variable-length codes whose lengths exceed N, the fixed-length codes which constitute the respective decoded equivalents of said variable-length codes;

e. reading out of said first memory unit to a data register the fixed-length code addressed by the length prefix currently stored in said first address register;

f. transferring the fixed-length code currently stored in said data register to a second address register associated with said second memory unit;

g. entering into said second address register from said bit stream the remaining bits of the variable-length code whose length prefix currently is stored in said first address register, thereby to form, in combination with at least a significant portion of the fixed-length code currently stored in said second address register, a new address for locating within said second memory unit the fixed-length code which is the decoded equivalent of the current variable-length code, the number of such remaining bits being determined at least in part by said length prefix;

h. shifting the contents of said first address register by N bits to bring the next succeeding N bits of said input bits stream into said first address register;

i. reading the currently addressed fixed-length code out of said second memory unit; and j. repeating steps (e) through (i) as needed to decode each of the succeeding variable-length codes in said input bit stream whose length exceeds N bits.

7. A method as set forth in claim 6 wherein the information (c) stored in said first memory unit at the address therein specified by each one of said length prefixes includes additional information designating the number of bits in excess of N which are represented by that length prefix, and step (g) is effective to cause the number of bits thus designated by the current length prefix to be entered from said bit stream into said second address register.

8. A code conversion method whereby data encoded as bit strings of variable length can be utilized in a data processing system having memory units and registers which are adapted to handle data encoded as bit strings of fixed length, said method comprising the steps of:

a. serially entering the leading bits of an input bit stream containing successive variable-length codes into a first one of said registers until the number of such entered bits equals a fixed number;

b. storing in a first memory unit, at each of the addresses therein specified by the various combinations of bits that may be entered into said first register, the following interrelated items of information:

b1. a fixed-length code corresponding to the first variable-length code or portion of such code which is defined upon entry of the respective bit combination into said first register, and b2. associated information which is related to the number of bits in said variable-length code;

c. storing in a second memory unit, at addressable locations therein which are determined in part by those fixed-length codes in said first memory unit that correspond to variable-length codes which contain more than said fixed number of bits, the fixed-length codes constituting the respective decoded equivalents of such variable-length codes;

d. reading out of said first memory unit to a second register the fixed-length code (b1) which is addressed by the bit combination currently stored in said first register, along with its associated information (b2);

e. performing one of the following two actions according to the contents of said associated information:

e1. if said associated information denotes that the variable-length code specified in step (b1) does not contain more than said fixed number of bits, then read out the contents of said second register as the decoded equivalent of such variable-length code, and thereafter shift the contents of said first register by a number of bit positions equal to the length of such variable-length code; or e2. if said associated information denotes that the variable-length code specified in step (b1) contains more than said fixed number of bits, then transfer the fixed-length code from said second register to a third register, also enter into said third register those bits which constitute the excess portion of said variable-length code, thereby to form a new address containing such bits in combination with at least a portion of said transferred code, then shift the contents of said first register by a number of bit positions equalling said fixed number, and read out of said second memory unit the fixed-length code corresponding to said new address as the decoded equivalent of said variable-length code; and f. repeating steps (d) and (e) as needed for enabling the information represented by the succeeding variable-length codes in said bit stream to be processed by said system.

9. A method of converting successive variable-length codes whose bits are contained in a serial bit stream into corresponding fixed-length codes, utilizing data processing instrumentalities such as memory units and registers that are capable of handling data in the form of fixed-length codes only, said method comprising the steps of:

a. storing a first set of fixed-length codes in a first memory unit at addresses therein which are identified respectively by various N-bit combinations, where N is a fixed integer;

b. storing a second set of fixed-length codes in a second memory unit at various addresses therein which are identified respectively by various M-bit combinations, where M is a fixed integer;

c. entering the first available N bits of said bit stream into a first address register;

d. reading out of said first memory unit the fixed-length code in said first set whose address is denoted by the N-bit combination stored in said first address register;

e. entering the fixed-length code read out of said first memory unit into a second address register;

f. entering into said second address register additional selected code bits to form, in conjunction with at least a significant portion of the fixed-length code entered therein during step (e), a distinctive M-bit combination; and g. reading out of said second memory unit the fixed-length code in said second set whose address is denoted by the M-bit combination stored in said second address register.

10. A method as set forth in claim 9 wherein the additional code bits entered into said second address register in step (f) comprise the bits of the current variable-length code exclusive of the N bits stored in said first address register.

11. A method as set forth in claim 9 wherein the additional code bits entered into said second address register in step (f) comprise the bits of a group code related to the fixed-length code which previously was read out of said second memory unit.

12. Data processing apparatus for converting data which is in the form of variable-length bit strings into data having the form of fixed-length bit strings, utilizing memory units and registers that are capable of handling fixed-length bit strings only, said apparatus comprising:

a. a shiftable address register capable of storing N bits, where N is a fixed integer;

b. means for entering variable-length code bits serially into said address register, to the N-bit capacity of said register;

c. a memory unit having addresses therein corresponding respectively to the various combinations of N bits that may be stored in said address register and adapted to store at each such address the following interrelated items of information:

c1. a fixed-length code corresponding to the first variable-length code or portion of such code which is defined upon entry of the respective N-bit combination denoting that address into said address register, and c2. associated information which is related to the number of bits in said variable-length code;

d. means for reading out of said memory unit the fixed-length code (c1) and associated information (c2) which are addressed by the N-bit combination currently stored in said address register; and e. means controlled by said reading means (d) for shifting the contents of said address register serially through a number of bit positions determined by said associated information (c2).

13. Apparatus as set forth in claim 12 wherein said shifting means (e) is effective whenever said associated information (c2) indicates that the current variable-length code does not exceed N bits in length to shift the contents of said address register by the number of bits in said variable-length code.

14. Apparatus as set forth in claim 12 wherein said shifting means (e) is effective whenever said associated information (c2) indicates that the current variable-length code exceeds N bits in length to shift the contents of said address register by N bits.

15. Apparatus for processing data which is encoded in the form of variable-length bit strings wherein the first N bits of any variable-length code exceeding N bits in length constitutes a length prefix uniquely identifying that particular code length, N being a fixed integer, said apparatus comprising:

a. a shiftable first address register capable of storing N bits;

b. means for entering variable-length code bits serially into said first address register, to the N-bit capacity of said register;

c. a first memory unit having addresses therein corresponding respectively to the various combinations of N bits that may be stored in said first address register and adapted to store at each such address the following interrelated items of information:

c1. a fixed-length code corresponding to the first variable-length code or N-bit portion of such code which is defined upon entry of the respective N-bit combination into said first address register, and c2. associated information which is related to the number of bits in said variable-length code, such information indicating, in the case of a code exceeding N bits in length, the number of bits which are represented by the respective N-bit prefix;

d. means for reading out of said first memory unit the fixed-length code (c1) and associated information (c2) which are addressed by the N-bit combination currently stored in said first address register;

e. means controlled by said reading means and effective when information (c2) indicates that the related variable-length code does not exceed N bits in length to shift the contents of said first address register by the number of bits contained within that variable-length code;

f. a second shiftable address register capable of storing M bits, where M is a fixed integer;

g. means controlled by said reading means (d) and effective when information (c2) indicates that the related variable-length code exceeds N bits in length to transfer the fixed-length code (c1) to said second address register and also effective to enter into said second address register the remaining bits of the current variable-length code, the number of such bits being indicated by said information (c2), thereby to form a combined M-bit address, and being further effective to shift the contents of said first address register by N bits;

h. a second memory unit having addressable locations therein corresponding respectively to the various M-bit combinations that may be stored in said second address register and adapted to store a distinctive fixed-length code at each such location; and i. means effective when said information (c2) indicates that the related variable-length code exceeds N bits in length for reading out of said second memory unit the fixed-length code addressed by the M-bit combination currently stored in said second address register.

16. Apparatus of the kind set forth in claim 15, further comprising the following elements:

j. a third address register;

k. a third memory unit for storing fixed-length codes at locations therein addressable by the contents of said third address register;

l. means for reading out of said third memory unit the fixed-length code addressed by the contents of said third address register;

m. means for converting each of the fixed-length codes read out by reading means (l) into a selected one of several group codes; and n. means for entering into said third address register the group code corresponding to the fixed-length code previously read out of said third memory unit in combination with one of the following:

n1. the fixed-length code (c1) read out of said first memory unit by said reading means (d), if the length of the current variable-length code does not exceed N bits, or n2. the fixed-length code read out of said second memory unit by said reading means (i), if the length of the current variable-length code exceeds N bits;

whereby said reading means (l) is effective to read out of said third memory unit a fixed-length code the identity of which is determined in part by the current variable-length code and in part by the preceding variable-length code.

17. Apparatus for converting successive variable-length codes whose bits are contained in a serial bit stream into corresponding fixed-length codes, said apparatus comprising:

a. a first address register capable of storing N bits, where N is a fixed integer;

b. a first memory unit for storing a first set of fixed-length codes at addresses therein which may be specified by the N-bit combination stored in said first address register;

c. means for entering bits from said bit stream into said first address register;

d. means for reading out of said first memory unit the fixed-length code in said first set whose address is specified by the N-bit combination in said first address register;

e. a second address register capable of storing M bits, where M is a fixed number;

f. a second memory unit for storing a second set of fixed-length codes at addresses therein which may be specified by the M-bit combination stored in said second address register;

g. data entry means controlled by said reading means (d) for causing the fixed-length code read out of said first memory unit to be entered into said second address register as a constituent of an M-bit address to be formed in said second address register;

h. other data entry means for entering into said second address register, as another constituent of said M-bit address, a group of additional selected code bits; and i. means for reading out of said second memory unit the fixed-length code in said second set corresponding to the M-bit address thus formed in said second address register.

18. Apparatus as set forth in claim 17 wherein said other data entry means (h) causes the remaining bits of the current variable-length code, excluding the N bits already entered in said first address register, to be entered into said second address register.

19. Apparatus as set forth in claim 17 which includes the following additional feature:

j. encoding means controlled by said reading means (i) for generating a group code corresponding to each fixed-length code which is read out of said second memory unit;

said other data entry means (h) being effective to enter the bits of each group code thus formed into said second address register as the other constituent of the next M-bit address which is formed therein.

20. Apparatus for processing data which is encoded in the form of variable-length bit strings wherein the first N bits of any variable-length code exceeding N bits in length constitutes a length prefix uniquely identifying that particular code length, N being a fixed integer, said apparatus comprising:

a. a primary processor including the following elements:

a1. a first address register capable of storing N bits, a2. means for entering variable-length code bits into said first address register, a3. a first memory unit for storing at various addressable locations therein fixed-length codes which respectively correspond to the various N-bit addresses that may be stored in said first address register, a4. a first data register, and a5. reading means for causing the fixed-length code which is addressed in said first memory unit by the N-bit address currently stored in said first address register to be entered into said first data register;

b. a secondary processor including the following elements:

b1. a second address register, b2. means for entering into said second address register the fixed-length code bits stored in said first data register together with variable-length code bits that have not been entered into said first address register, b3. a second memory unit for storing at various addressable locations therein fixed-length codes which respectively correspond to the various addresses that may be stored in said second address register, b4. a second data register, and b5. reading means for causing the fixed-length code which is addressed in said second memory unit by the address currently stored in said second address register to be entered into said second data register; and c. control means effective when said entering means (b2) has completed an entry into said second address register, but before said reading means (b5) has effected a corresponding entry into said second data register, to initiate a new operation of said entering means (a2), whereby the operations of said primary and secondary processors are overlapped.

* * * * *